(12) United States Patent
Miyachi

(10) Patent No.: US 7,095,467 B2
(45) Date of Patent: *Aug. 22, 2006

(54) LIQUID CRYSTAL DISPLAY DEVICE

(75) Inventor: Koichi Miyachi, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,798

(22) Filed: Mar. 25, 2005

(65) Prior Publication Data

US 2005/0162593 A1    Jul. 28, 2005

Related U.S. Application Data

(63) Continuation of application No. 10/467,765, filed as application No. PCT/JP03/02521 on Mar. 4, 2003, now Pat. No. 6,885,421.

(30) Foreign Application Priority Data

Mar. 8, 2002    (JP) .............................. 2002-064481

(51) Int. Cl.
*G02F 1/1336* (2006.01)

(52) U.S. Cl. ..................... 349/119; 349/118; 349/120; 349/130; 349/178

(58) Field of Classification Search ................ 349/117, 349/118, 119, 120, 130, 178
See application file for complete search history.

(56) References Cited

U.S. PATENT DOCUMENTS

| | | |
|---|---|---|
| 6,281,956 B1 | 8/2001 | Ohmuro et al. |
| 6,339,460 B1 | 1/2002 | Saitoh |
| 6,359,671 B1 | 3/2002 | Abileah |
| 6,512,561 B1 | 1/2003 | Terashita et al. |
| 6,628,359 B1 | 9/2003 | Terashita et al. |
| 6,642,981 B1 | 11/2003 | Ohmuro et al. |
| 6,661,488 B1 | 12/2003 | Takeda et al. |
| 2003/0169391 A1 | 9/2003 | Uchida et al. |

FOREIGN PATENT DOCUMENTS

| | | |
|---|---|---|
| EP | 0 899 605 A2 | 3/1999 |
| EP | 1 113 311 A2 | 7/2001 |
| JP | 7-69536 | 7/1995 |
| JP | 11-95208 | 4/1999 |
| JP | 11-95208 A | 4/1999 |

OTHER PUBLICATIONS

Gu et al; "Extended Jones Matrix Method. II"; Journal of the Optical Society of America A; vol. 10, No. 5, 1993; pp. 966-973.

*Primary Examiner*—Toan Ton
*Assistant Examiner*—Tai Duong
(74) *Attorney, Agent, or Firm*—Nixon & Vanderhye, P.C.

(57) ABSTRACT

A positive uniaxial film 14 with a retardation of Rp [nm] in an in-plane direction is disposed between a vertical alignment mode liquid crystal cell 11 and a polarizing plate 12, and a negative uniaxial film 15 with a retardation of Rn [nm] in a thickness direction is disposed between the positive uniaxial film 14 and the polarizing plate 12. Further, when a parameter α1 [nm] in relation to Rp is $35+(Rlc/80-4)^2 \times 3.5+(360-Rlc) \times Rtac/850$; and a parameter β1 [nm] in relation to Rn is $Rlc-1.9 \times Rtac$, where Rtac [nm] is a retardation in a thickness direction of the respective base films of polarizing plates 12 and 13, the retardations Rp and Rn are set to fall within ranges of 80% to 120% of the parameter α1 and 60% to 90% of the parameter β1, respectively.

6 Claims, 14 Drawing Sheets

FIG. 6

| THICKNESS OF LIQUID CRYSTAL CELL [μm] | $R_{TAC}$ [nm] | Rp [nm] | Rn [nm] |
|---|---|---|---|
| 3.0 | 0 | 38 | 243 |
| | 30 | 41 | 181 |
| | 50 | 43 | 140 |
| | 80 | 49 | 77 |
| 4.0 | 0 | 35 | 331 |
| | 30 | 36 | 270 |
| | 50 | 36 | 230 |
| | 80 | 38 | 169 |
| 4.5 (Rlc=360[nm]) | 0 | 37 | 371 |
| | 30 | 36 | 311 |
| | 50 | 36 | 271 |
| | 80 | 37 | 211 |
| 5.0 | 0 | 39 | 417 |
| | 30 | 37 | 358 |
| | 50 | 36 | 318 |
| | 80 | 35 | 259 |

| THICKNESS OF LIQUID CRYSTAL CELL [μm] | $R_{TAC}$ [nm] | $R_{XY}$ [nm] | $R_Z$ [nm] |
|---|---|---|---|
| 3.0 | 0 | 65 | 250 |
| | 30 | 63 | 194 |
| | 50 | 62 | 156 |
| | 80 | 62 | 98 |
| 4.0 | 0 | 55 | 337 |
| | 30 | 53 | 280 |
| | 50 | 52 | 240 |
| | 80 | 51 | 183 |
| 5.0 | 0 | 50 | 425 |
| | 30 | 48 | 367 |
| | 50 | 47 | 328 |
| | 80 | 45 | 271 |

FIG. 15
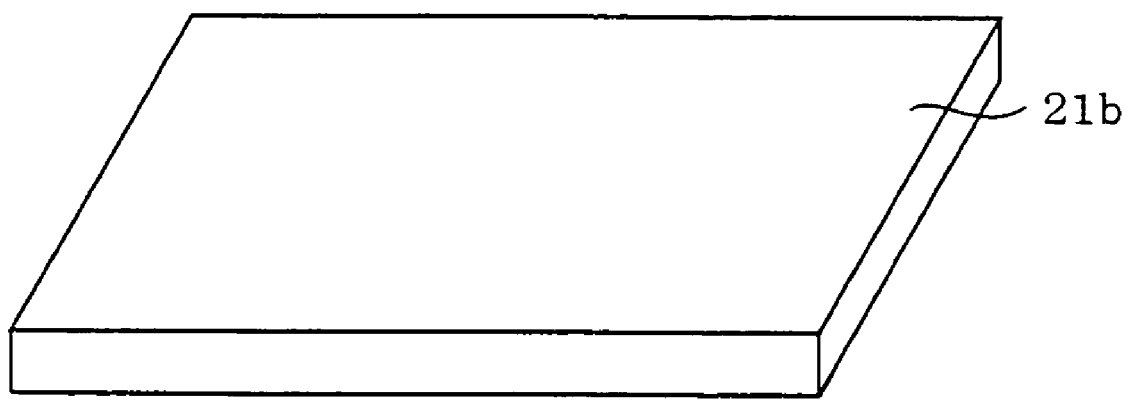
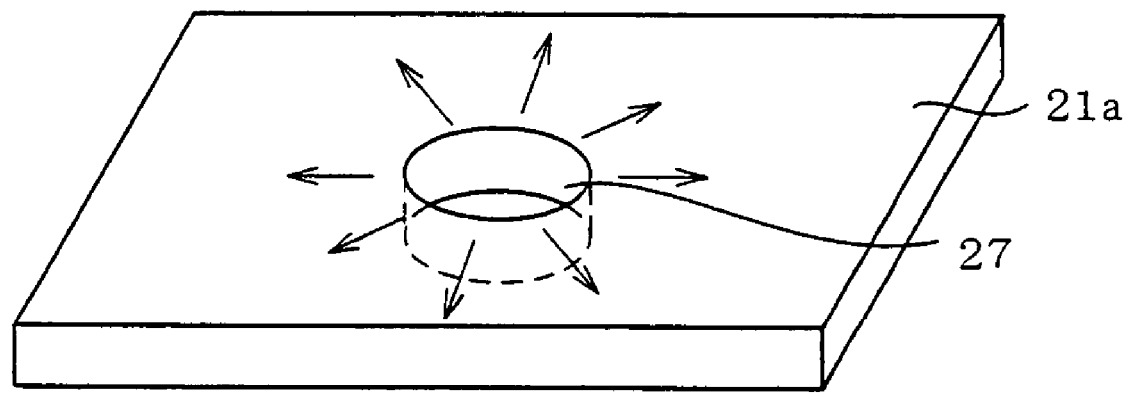

LIQUID CRYSTAL DISPLAY DEVICE

This application is a continuation of U.S. patent application Ser. No. 10/467,765 filed Aug. 12, 2003 (U.S. Pat. No. 6,885,421, issued Apr. 26, 2005) which is the US national phase of international application PCT/JP03/02521 filed 4 Mar. 2003, which designated the US and claims priority from JP application number 2003-064481 filed Mar. 8, 2002, all of which are incorporated herein by reference.

TECHNICAL FIELD

The present invention relates to a vertical alignment mode liquid crystal display device.

BACKGROUND ART

Conventionally, a liquid crystal display device has been widely used for the screen of a word processor and a computer. In recent years, the liquid crystal display device has spread rapidly as a television screen. Many of these liquid crystal display devices adopt TN (Twisted Nematic) mode. However, the TN mode liquid crystal display device has the problems of tendencies to degrade a contrast and to reverse a gradation property when viewed from an oblique direction.

For this reason, in recent years, in light of the improvement in viewing angle property when viewed from an oblique direction, a VA (Vertical Alignment) mode liquid crystal display device has been attracting attention. A liquid crystal cell of the VA mode liquid crystal display device is arranged in combination of a nematic liquid crystal having a negative dielectric anisotropy with a vertical alignment film.

Further, for example, Japanese Patent No. 2947350 (published on Sep. 13, 1999) and Japanese Laid-Open Patent Publication No. 2000-39610 (published on Feb. 8, 2000), as shown in FIGS. 16 and 17, disclose a liquid crystal display device 101 in which a biaxial film 116 is provided between a liquid crystal cell 111 and a polarizing plate 112, and a liquid crystal display device 101a in which a positive uniaxial film 114 and a negative uniaxial film 115 are provided between the liquid crystal cell 111 and the polarizing plate 112 and between the positive uniaxial film 114 and the polarizing plate 112, respectively, in order to optically compensate for the optical anisotropy of the liquid crystal cell 111 when black image is displayed.

With the above arrangement, even though the liquid crystal cell 111 brings a phase difference depending on a polar angle to transmitting light when the liquid crystal cell 111 in which liquid crystal molecules are oriented vertically is viewed from an oblique direction, the phase difference can be compensated by properly setting the respective retardations of the film 116 (films 114 and 115). Therefore, a black display can be performed substantially as in the case when the liquid crystal cell 111 is viewed from a front direction, that is, as in the case where the liquid crystal molecules maintain the polarized state of the transmitting light. As a result of this, it is possible to prevent light leakage, thus enhancing the contrast and suppressing the occurrence of coloring and tone degradation when viewed from an oblique direction.

However, nowadays, under the situation where a liquid crystal display device with a wider viewing angle and higher display quality is expected, there is a demand for the improvement in coloring and tone degradation caused when viewed from the oblique direction. The liquid crystal display device using the films 116 (114 and 115) with the retardation described in Japanese Patent No. 2947350 and Japanese Laid-Open Patent Publication No. 2000-39610, however, is not always satisfactory and still leaves room for improvement.

In view of the above problems, the present invention in a vertical alignment mode liquid crystal display device is attained as a result of investigating the effects of base films of polarizing plates on suitable retardations of films for the suppression of coloring and tone degradation when viewed from an oblique direction. It is therefore an object of the present invention is to surely provide a liquid crystal display device in which the coloring and tone degradation can be suppressed within allowable limits in practical use, while maintaining a contrast at a sufficiently high value in practical use when viewed from an oblique direction.

DISCLOSURE OF INVENTION

In order to achieve the above object, a liquid crystal display device according to the present invention, includes:

a liquid crystal cell having a pair of substrates and liquid crystal interposed therebetween, wherein liquid crystal molecules of the liquid crystal are oriented substantially vertically to respective surfaces of the pair of substrates;

a pair of polarizing plates disposed so as to sandwich the liquid crystal cell therebetween, respective absorption axes of the pair of polarizing plates being orthogonal to each other;

a first phase difference film, disposed between one of the pair of polarizing plates and the liquid crystal cell, the first phase difference film having a positive uniaxial anisotropy; and a second phase difference film, disposed between the one of the pair of polarizing plates and the first phase difference film, the second phase difference film having a negative uniaxial anisotropy, wherein each of the pair of polarizing plates has a base film with an optical axis substantially vertical to the pair of substrates, the base film having a negative uniaxial anisotropy, the first phase difference film has a retardation axis crossing at right angle the absorption axis of the one of the pair of polarizing plates on the same side when seen from the liquid crystal, and the second phase difference film has an optical axis substantially vertical to the pair of substrates, taking the following means.

More specifically, when a parameter $\alpha$ [nm] in relation to Rp is:

$$\alpha = 35 + (Rlc/80 - 4)^2 \times 3.5 + (360 - Rlc) \times Rtac/850;\ \text{and}$$

a parameter $\beta$ [nm] in relation to Rn is:

$$\beta = Rlc - 1.9 \times Rtac,$$

where Rp [nm] is a retardation in an in-plane direction of the first phase difference film, Rn [nm] is a retardation in a thickness direction of the second phase difference film, Rtac [nm] is a retardation in a thickness direction of the base films, and Rlc [nm] is a retardation in a thickness direction of the liquid crystal, the retardation Rp is set to fall within the range from not less than 80% to not more than 120% of the parameter $\alpha$, and the retardation Rn is set to fall within the range from not less than 60% to not more than 90% of the parameter $\beta$.

In the above-arranged liquid crystal display device, liquid crystal molecules oriented substantially vertically to the substrates, although not bringing a phase difference to light incident from the normal direction to the substrate, bring a phase difference depending on a polar angle (tilt angle to the normal direction) to obliquely incident light. Therefore, the liquid crystal display device cannot completely absorb the light supposed to be absorbed by the polarizing plate on the side from where the light emits, without the first and second phase difference films. This results in the occurrence of light leakage, thus degrading a contrast and causing the coloring and tone degradation.

In order to solve the problem, since the above arrangement is provided with first and second phase difference films, the phase difference that the liquid crystal has brought depending on the polar angle can be compensated by the first and second phase difference films. As a result of this, it is possible to prevent light leakage when viewed from an oblique direction, enhancing the contrast and preventing the occurrence of coloring and tone degradation.

Incidentally, when the respective retardations of the first and second phase difference films are determined, it cannot be always said that just subtracting the retardation in the thickness direction of the base films from each of the respective retardations in the thickness direction of the first and second phase difference films, which is an optimum retardation when base films are absent, is sufficient, because the coloring and tone degradation caused when viewed from an oblique direction are required to be suppressed much further.

The inventors of the present application, as a result of extensive research to further suppress the coloring and tone degradation, while maintaining a contrast at a sufficiently high value in practical use when a vertical alignment mode liquid crystal display device is viewed from an oblique direction, have found that the retardation in the thickness direction of the base films does not always function as equally as each of the retardation in the thickness direction of the first phase difference film and the retardation in the thickness direction of the second phase difference film. Specifically, the inventors have found to complete the present invention that: when the retardation in the in-plane direction of the first phase difference film with a positive uniaxial anisotropy is set so that the contrast becomes the maximum, the dependency of the retardation Rp on the retardation in the thickness direction of the base films, reverses depending on whether the retardation of the liquid crystal is over 360 [nm], and it is possible to effectively suppress the coloring and tone degradation by setting the retardations to fall within a predetermined range with reference to such retardations that the contrast becomes the maximum.

In the liquid crystal display device of the present invention, the retardations Rp and Rn are set according to the retardation Rtac in the thickness direction of the base films and the retardation Rlc in the thickness direction of the liquid crystal, and the retardations Rp and Rn are set to fall within the range where the coloring and tone degradation can be tolerated, while maintaining a contrast at a sufficiently high value in practical use when viewed from an oblique direction. With this arrangement, unlike the arrangement in which the retardation in the thickness direction of the base films is treated equally to the retardation in the thickness direction of the first phase difference film and the retardation in the thickness direction of the second phase difference film, it is possible to surely obtain a liquid crystal display device which can maintain a contrast at a sufficiently high value in practical use when viewed from the oblique direction and limit the coloring and tone degradation within allowable limits.

In the case where the improvement in productivity is especially required, in addition to the above arrangement, it is desirable that the retardation Rlc in the thickness direction of the liquid crystal is set to fall in the range from 324 [nm] to 396 [nm], and the retardation Rp in the in-plane direction of the first phase difference film is set to fall within a range from 30.7 [nm] to 41.7 [nm].

If the retardation Rlc is set to fall within the foregoing range, the dependency of the retardation Rp on the retardation in the thickness direction of the base films is small. Therefore, even in the case where the variations of the base films caused in the manufacturing process varies the retardation in the thickness direction of the base films, the retardation Rp can be set to fall within the range from 80% to 120% of the parameter $\alpha$ by setting the retardations Rlc and Rp to be in the foregoing ranges. As a result of this, even in the case where the retardation in the thickness direction of the base films varies, it is possible to use the same first phase difference film, thus improving the productivity.

Further, in the case where the suppression of coloring and tone degradation is especially required, in addition to the above arrangement, it is desirable that the retardation Rp is set to fall within the range from not less than 90% to not more than 110% of the parameter $\alpha$, and the retardation Rn is set to fall within the range from not less than 65% to not more than 85% of the parameter $\beta$. With this arrangement, it is possible to obtain a liquid crystal display device which can further suppress the coloring and tone degradation when viewed from an oblique direction.

Still further, in the case where both the suppression of coloring and tone degradation and the improvement in productivity are especially required, it is desirable that the retardation Rlc in the thickness direction of the liquid crystal is set to fall within the range from 342 [nm] to 378 [nm], and the retardation Rp in the in-plane direction of the first phase difference film is set to fall within the range from 33.3 [nm] to 38.6 [nm].

If the retardations Rlc and Rp are set to fall within the foregoing ranges, the retardation Rp can be set to fall within the range from 90% to 110% of the parameter $\alpha$ even in the case where the variations of the base films caused in the manufacturing process varies the retardation in the thickness direction of the base films. As a result of this, even in the case where the retardation in the thickness direction of the base films varies, it is possible to use the same first phase difference film, thus improving the productivity.

For a fuller understanding of the nature and advantages of the invention, reference should be made to the ensuing detailed description taken in conjunction with the accompanying drawings.

BRIEF DESCRIPTION OF DRAWINGS

FIG. 6 shows experimental results of optimal values for the retardations with respect to the combination of a liquid crystal cell with a polarizing plate in an example of the present invention.

FIG. 15 is a perspective view showing a pixel electrode and a counter electrode of a liquid crystal cell in still another arrangement example of the foregoing liquid crystal display devices.

BEST MODE FOR CARRYING OUT THE INVENTION

FIRST EMBODIMENT

Referring to FIGS. 1 to 7, the following will explain one embodiment of the present invention. Note that, as described in detail later, the present invention can be applied to other liquid crystal cell; however, the following will explain a multi-domain vertical alignment liquid crystal cell as one preferable example of a liquid crystal cell.

Figure 1:
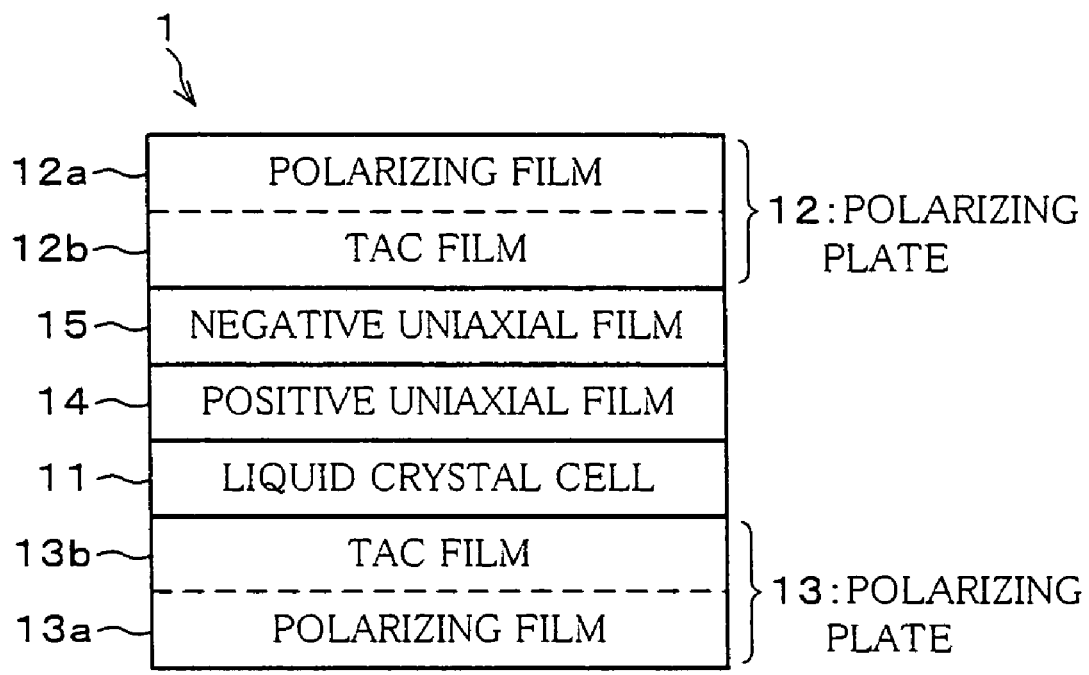
FIG. 1 is a schematic diagram showing the main arrangement of a liquid crystal display device according to an embodiment of the present invention.

A liquid crystal display device 1 according to the present embodiment, as shown in FIG. 1, has a layer structure, including a vertical alignment (VA) mode liquid crystal cell 11, polarizing plates 12 and 13 which are respectively disposed so as to sandwich the liquid crystal cell 11 therebetween, a positive uniaxial film (first phase difference film) 14 which is disposed between the polarizing plate 12 and the liquid crystal cell 11, and a negative uniaxial film (second phase difference film) 15 which is disposed between the positive uniaxial film 14 and the polarizing plate 12.

Figure 2:
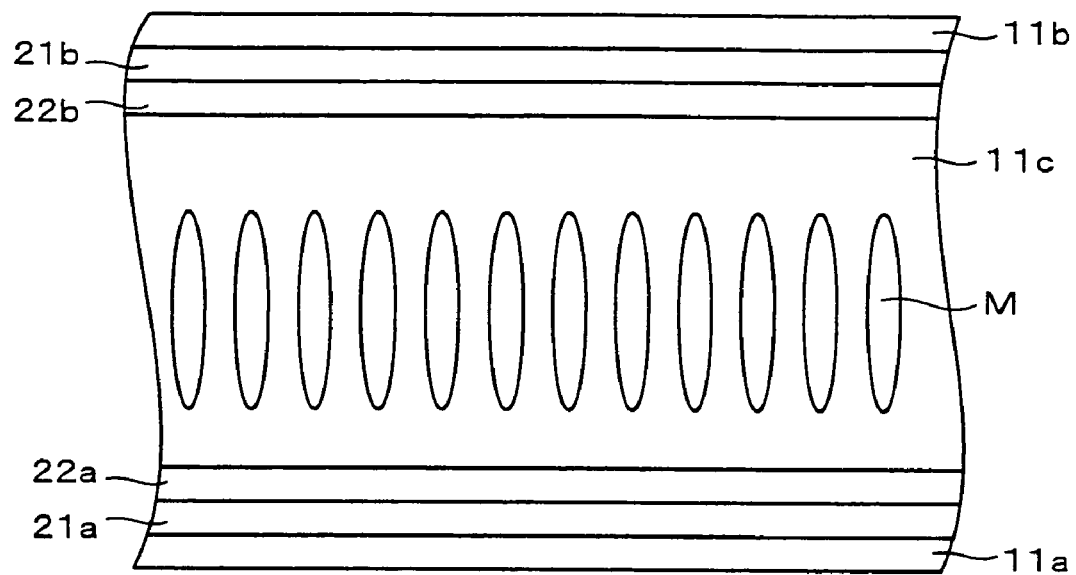
FIG. 2 is a schematic diagram showing a liquid crystal cell provided in the liquid crystal display device in the state where no voltage is applied.

The liquid crystal cell 11, as shown in FIG. 2, includes: a TFT (Thin Film Transistor) substrate 11a provided with a pixel electrode 21a corresponding to a pixel (described later); a counter substrate 11b provided with a counter electrode 21b; and a liquid crystal layer 11c, sandwiched between the substrates 11a and 11b, which is a nematic liquid crystal with negative dielectric anisotropy. Note that, the liquid crystal display device 1 according to the present embodiment is capable of color display, and a color filter including the colors of pixels is formed on the counter substrate 11b.

Further, under the TFT substrate 11a provided with the pixel electrode 21a, a vertical alignment film 22a is formed on one side surface of the liquid crystal layer 11c. Similarly, under the counter substrate 11b provided with the counter electrode 21b, a vertical alignment film 22b is formed on the other side surface of the liquid crystal layer 11c. With this arrangement, in the state where a voltage is not applied between the two electrodes 21a and 21b, liquid crystal molecules M in the liquid crystal layer 11c, which is disposed between the two substrates 11a and 11b, are oriented vertically to the surfaces of the substrates 11a and 11b. On the other hand, when a voltage is applied between the two electrodes 21a and 21b, the liquid crystal molecules M in the state of being oriented in the normal direction to the substrates 11a and 11b (in the state where no voltage is applied) tilt at a tilt angle depending on the applied voltage (see FIG. 3). Note that, the two substrates 11a and 11b are opposed to each other, so that the normal direction and in-plane direction with respect to the substrates 11a and 11b are hereinafter referred to just as normal direction and in-plane direction, except for the case where they are required to be distinguished.

Here, the liquid crystal cell 11 according to the present embodiment is a multi-domain vertical alignment liquid crystal cell in which each pixel is divided into a plurality of regions (domains), and is controlled so that the domains have mutually different orientation directions, i.e. azimuths of the liquid crystal molecules M tilted when a voltage is applied (in-plane components at a tilt angle).

Figure 4:
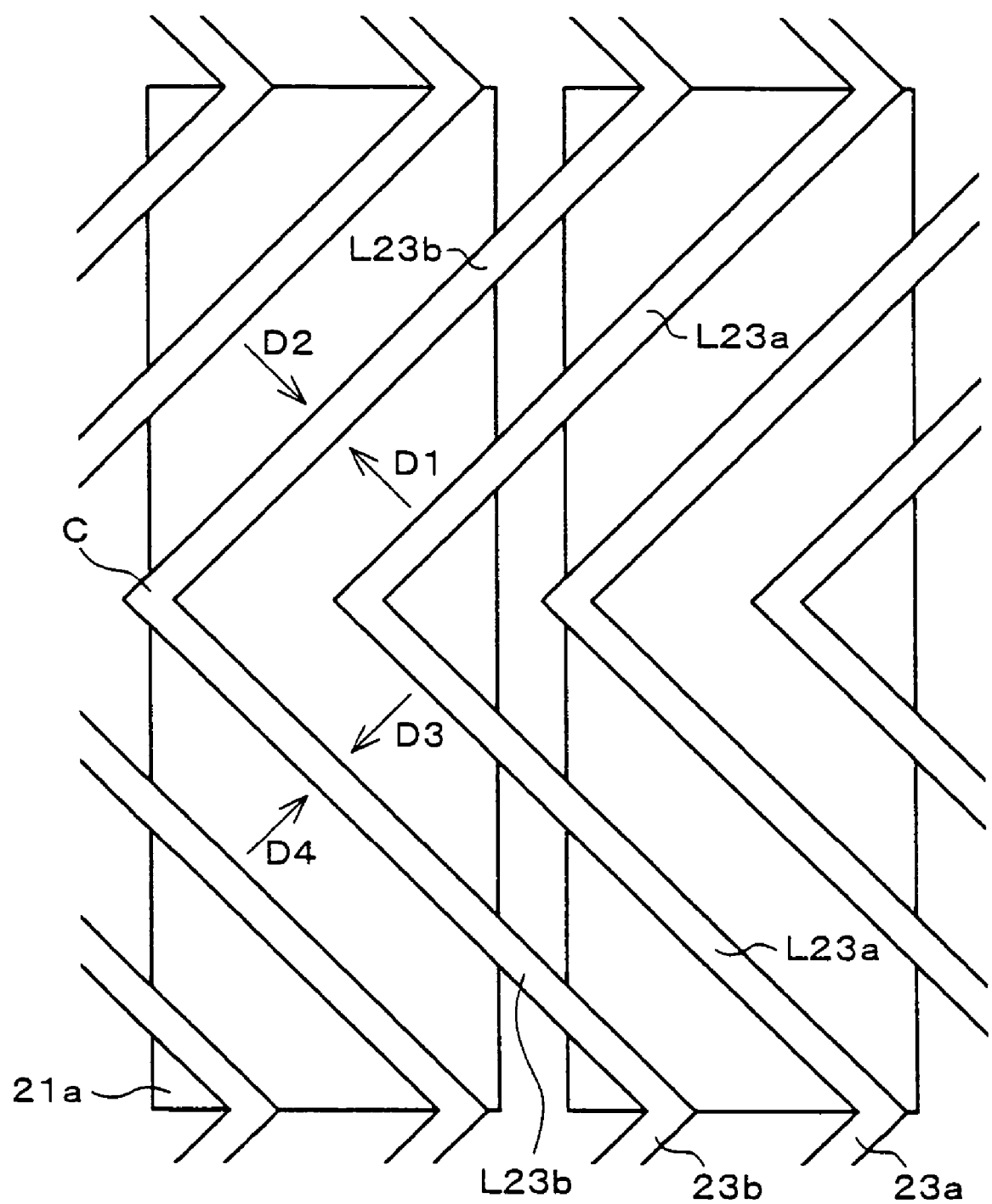
FIG. 4 is a plan view showing the vicinity of a pixel electrode in an arrangement example of the liquid crystal cell.

More specifically, as shown in FIG. 4, the pixel electrode 21a has protrusions 23a formed thereon in a stripe pattern, and each of the protrusions 23a zigzags appropriately at right angles in the in-plane direction with a mountain shape in cross-section. Similarly, the counter electrode 21b has protrusions 23b formed thereon in a stripe pattern, and each of the protrusions 23b zigzags appropriately at right angles in the in-plane direction with a mountain shape in the normal direction. The two protrusions 23a and 23b in the in-plane direction are disposed at such a distance that the normal to the slope of the protrusion 23a is substantially equal to the normal to the slope of the protrusion 23b. Further, the protrusions 23a and 23b are formed by the application of a photosensitive resin on the pixel electrode 21a and the counter electrode 21b, respectively, and the process of photolithography.

Here, the liquid crystal molecules near the protrusions 23a are oriented so as to be vertical to the slopes of the protrusions 23. In addition, when a voltage is applied, the electric field near the protrusions 23a tilts so as to be parallel to the slopes of the protrusions 23a. Here, the long axes of the liquid crystal molecules tilt in the vertical direction with respect to the electric field. According to the continuity of liquid crystal, the liquid crystal molecules away from the slopes of the protrusions 23a are oriented as well in the same direction as the direction in which the liquid crystal molecules near the slopes of the protrusions 23a tilt. Similarly, when a voltage is applied, the electric field near the protrusions 23b tilts so as to be parallel to the slopes of the protrusions 23b. Here, the long axes of the liquid crystal molecules tilt in the vertical direction with respect to the electric field. According to the continuity of liquid crystal, the liquid crystal molecules away from the slopes of the protrusions 23b are oriented as well in the same direction as the direction in which the liquid crystal molecules near the slopes of the protrusions 23b tilt.

Consequently, as to the protrusions 23a and 23b, when parts except for a corner part C are referred to as line parts, in the region between a line part L23a of the protrusion 23a and a line part L23b of the protrusion 23b, in-plane component as the orientation direction of the liquid crystal molecules when a voltage is applied is equal to that in the direction from the line part L23a to the line part L23b.

Here, in the protrusions 23a and 23b, the corner part C bends approximately at right angles. Therefore, the orientation directions of the liquid crystal molecules are divided into four parts in a pixel, and this can form domains D1 to D4 of mutually different orientation directions of the liquid crystal molecules in the pixel.

On the other hand, the polarizing plates 12 and 13 shown in FIG. 1 are respectively provided with polarizing films 12a and 13a and triacetyl cellulose (TAC) films 12b and 13b as base films for holding the polarizing films 12a and 13a. The two TAC films 12b and 13b have negative optically uniaxial anisotropy, and the respective optical axes are set so as to be substantially equal to the normal direction of the liquid crystal cell 11. The two polarizing plates 12 and 13 are disposed so that an absorption axis AA12 of the polarizing plate 12 is orthogonal to an absorption axis AA13 of the polarizing plate 13. Further, the two polarizing plates 12 and 13 are disposed so that each of the absorption axes AA12 and AA13 forms an angle of 45 degrees with the in-plane component in the orientation direction of the liquid crystal molecules in each of the domains D1 to D4 when a voltage is applied.

Further, the positive uniaxial film 14, which is layered on one surface of the liquid crystal cell 11, is an optically anisotropic film having the property of nxp>nyp=nzp, where nxp and nyp are refractive indexes in the in-plane direction of the film, and nzp is a refractive index in the normal direction. Let a film thickness be dp, retardation Rp in the in-plane direction can be calculated by the following expression (1):

$$Rp=dp \cdot (nxp-nyp) \qquad (1).$$

Further, the positive uniaxial film 14 is disposed so that its retardation axis SL14 is orthogonal to the absorption axis AA12 of the polarizing plate 12 at the same side when viewed from the liquid crystal cell 11.

Meanwhile, the negative uniaxial film 15, which is layered on the other surface of the liquid crystal cell 11, is an optically anisotropic film having the property of nxn=nyn>nzn, where nxn and nyn are refractive indexes in the in-plane direction of the film, and nzn is a refractive index in the normal direction. Let a film thickness be dn, retardation Rn in the thickness direction can be calculated by the following expression (2):

$$Rn=dn \cdot \{(nxn+nyn)/2-nzn\} \qquad (2).$$

Further, the negative uniaxial film 15 is disposed so that its optical axis is substantially equal to the normal direction of the liquid crystal cell 11.

Figure 3:
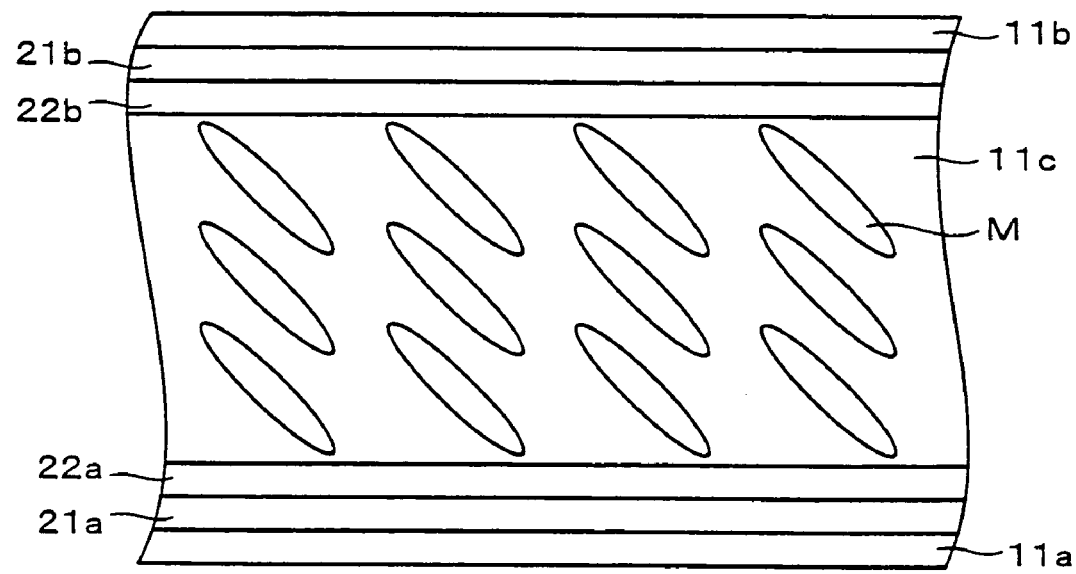
FIG. 3 is a schematic diagram showing a liquid crystal cell provided in the liquid crystal display device in the state where a voltage is applied.

With the above-arranged liquid crystal display device 1, while a voltage is applied between the pixel electrode 21a and the counter electrode 21b, the liquid crystal molecules in the liquid crystal cell 11, as shown in FIG. 3, are obliquely oriented to the normal direction just at the angle depending on the applied voltage. This brings a phase difference depending on the applied voltage to light passing through the liquid crystal cell 11.

Here, the absorption axes AA12 and AA13 of the polarizing plates 12 and 13 are disposed so as to be orthogonal to each other. As described in detail later, the positive uniaxial film 14 and negative uniaxial film 15 are arranged so as to compensate the phase difference that the liquid crystal cell 11 brings to transmitting light in the case where the liquid crystal molecules in the liquid crystal cell 11 are oriented in the normal direction, as shown in FIG. 2.

Therefore, light incident to a polarizing plate on the side from where the light emits (e.g. the polarizing plate 12) turns elliptically polarized light depending on the phase difference that the liquid crystal cell 11 brings, and a part of the incident light passes through the polarizing plate 12. As a result of this, the amount of light emitted from the polarizing plate 12 can be controlled in accordance with the applied voltage. This makes it possible to display with gradations.

Further, the liquid crystal cell 11 has domains D1 to D4 formed of mutually different orientation directions of the liquid crystal molecules in a pixel. Therefore, even in the case where the liquid crystal molecules cannot bring phase difference to transmitting light when the liquid crystal cell 11 is viewed from the direction which is parallel to the orientation direction of liquid crystal molecules which belong to a certain domain (e.g. the domain D1), the liquid crystal molecules in the rest of domains (the domains D2 to D4 in this case) can bring phase difference to transmitting light. Thus, the domains can optically compensate with one another. As a result of this, it is possible to improve a display quality level of the liquid crystal cell 11 and to increase a viewing angle when viewed from an oblique direction.

On the other hand, while a voltage is not applied between the pixel electrode 21a and the counter electrode 21b, the liquid crystal molecules in the liquid crystal cell 11, as shown in FIG. 2, are in the state of being oriented vertically. In this state (when no voltage is applied), the light incident from the normal direction to the liquid crystal cell 11, which cannot be brought phase difference by the liquid crystal molecules, passes through the liquid crystal cell 11, maintaining a polarized state. As a result of this, light incident to a polarizing plate on the side from where the light emits (e.g. the polarizing plate 12) turns linearly polarized light which is substantially parallel to the absorption axis AA12 of the polarizing plate 12 and cannot pass through the polarizing plate 12. This allows the liquid crystal display device 1 to display black image.

Here, to the light incident from an oblique direction to the liquid crystal cell 11, brought by liquid crystal molecules is the phase difference depending on the angle between the incident light and the orientation direction of the liquid crystal molecules, that is, the angle (polar angle) between the incident light and the normal direction to the liquid crystal cell 11. Therefore, without the positive uniaxial film 14 and the negative uniaxial film 15, the light incident to the polarizing plate 12 turns elliptically polarized light depending on the polar angle, and a part of the polarized light passes through the polarizing plate 12. This results in the occurrence of light leakage even in the state where the liquid crystal molecules are oriented vertically to display black image, which could degrade display contrast and cause the coloring and tone degradation.

However, with the arrangement shown in FIG. 1 in which the positive uniaxial film 14 and the negative uniaxial film 15 are provided, if the respective retardations are properly set, the phase difference brought depending on the polar angle by the liquid crystal cell 11 can be cancelled. As a result of this, it is possible to prevent light leakage, thus enhancing the contrast and suppressing the occurrence of coloring and tone degradation when viewed from an oblique direction.

Here, in the liquid crystal display device 1 according to the present embodiment, the respective retardations of the positive uniaxial film 14 and the negative uniaxial film 15 are set as described below, in order to attain a liquid crystal display device which characterizes excellent color and gradation, maintaining a sufficiently high contrast in practical use, as a display quality level when viewed obliquely; more specifically, in order to attain a liquid crystal display device such that a viewer hardly perceives the coloring and tone degradation when viewing from an oblique direction, keeping the contrast of a sufficiently high value of 10 or more in practical use when viewed from an oblique direction.

Specifically, when retardation Rtac [nm] in the thickness direction of the TAC films 12b and 13b and a parameter $\alpha 1$ [nm] in relation to the retardation Rp are expressed by the following expression (3):

$$\alpha 1 = 35 + (Rlc/80 - 4)^2 \times 3.5 + (360 - Rlc) \times Rtac/850 \quad (3),$$

the retardation Rp in the in-plane direction of the positive uniaxial film 14 is set to fall within the range of not less than 80% to more than 120% of the parameter $\alpha 1$.

Further, when retardation Rlc [nm] in the thickness direction of the liquid crystal cell 11 and a parameter $\beta 1$ [nm] in relation to the retardation Rn are expressed by the following expression (4):

$$\beta 1 = Rlc - 1.9 \times Rtac \quad (4),$$

the retardation Rn in the thickness direction of the negative uniaxial film 15 is set to fall within the range of not less than 60% to not more than 90% of the parameter $\beta 1$.

Figure 5:
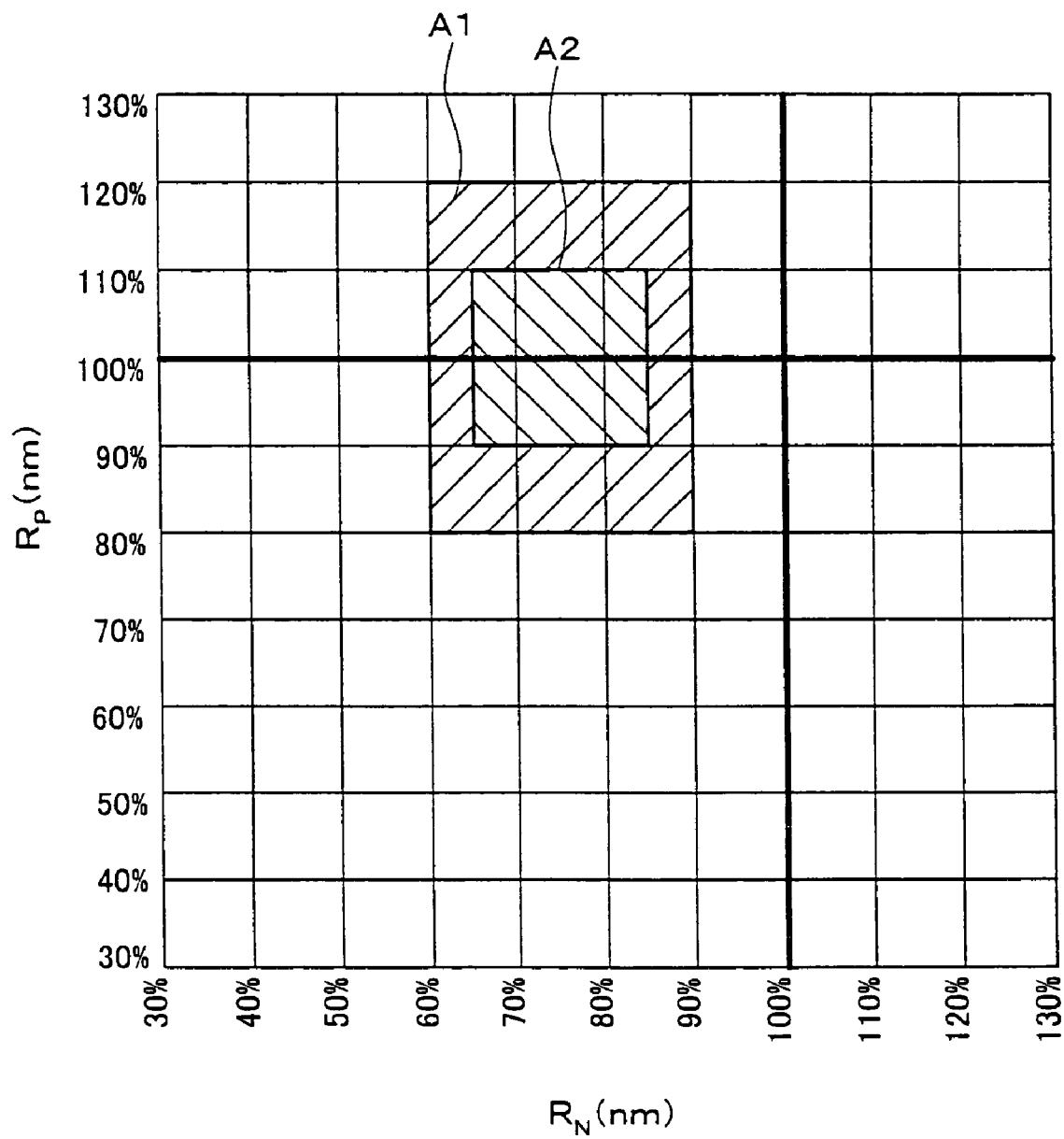
FIG. 5 shows preferable ranges for retardation in the in-plane direction of a positive uniaxial film and retardation in the thickness direction of a negative uniaxial film which are provided in the liquid crystal display device, where the retardations are expressed by relative values to the respective parameters.

Thus, by setting the retardations Rp and Rn to be in the range A1 shown in FIG. 5 with reference to the parameters $\alpha 1$ and $\beta 1$, it is possible to surely attain the liquid crystal display device 1 with such an excellent viewing angle property that a viewer hardly perceives the coloring and tone degradation when viewing from an oblique direction, maintaining the contrast of a sufficiently high value of 10 or more in practical use when viewed from an oblique direction.

Further, less coloring and tone degradation found by the viewer occur in the inner part than in the peripheral part of the range A1. Especially, as in a range A2 shown in FIG. 5, by setting the retardation Rp to fall within the range from not less than 90% to not more than 110% of the parameter $\alpha 1$ as well as by setting the retardation Rn to fall within the range from not less than 65% to not more than 85% of the parameter $\beta 1$, it is possible to realize the liquid crystal display device 1 with more excellent viewing angle property.

Note that, when the retardations Rp and Rn are set to fall with the range A2, the improvement in the coloring and tone degradation more than that obtained when those are set to fall within the range A1 is not recognized by the viewer, and the improvement in the coloring and tone degradation is substantially saturated. Therefore, by setting the retardations Rp and Rn to be in the range A2, it is possible to realize the liquid crystal display device 1 with such an excellent display quality level. Further, when the retardations Rp and Rn are respectively set to the same values of the parameters $\alpha 1$ and $\beta 1$, the contrast when viewed from an oblique direction becomes the maximum. Still further, the retardations Rp and Rn respectively set to the values ranging from 80% to 120% of the parameter $\alpha 1$ and 85% to 90% of the parameter $\beta 1$ can suppress the occurrence of the coloring and tone degradation within allowing limits as well as enhance the contrast, as compared with the case where the retardations Rp and Rn are set to fall within the range A2.

Here, as obvious from the expression (5), the increase or degrease in the optimal value of the retardation Rp in the in-plane direction of the positive uniaxial film 14 according to the retardation Rtac in the thickness direction of the TAC films 12b and 13b varies depending on the retardation Rlc in the thickness direction of the liquid crystal cell 11. On the border of the retardation Rlc of 360 [nm] of the liquid crystal cell 11, dependency of the optimal retardation Rp on the retardation Rtac is reversed.

Therefore, by setting the retardation Rlc in the thickness direction of the liquid crystal cell 11 to 360 [nm], it is possible to fix the retardation Rp in the in-plane direction of the positive uniaxial film 14 to 35.9 [nm] regardless of the retardation Rtac.

Further, in the case where the retardation Rlc is in the range from 324 [nm] to 396 [nm] and the retardation Rp is in the range from 30.7 [nm] to 41.7 [nm], the retardation Rp is within the range from 80% to 120% of the parameter $\alpha 1$ under the condition that the retardation Rtac is a general value, i.e. approximately 30 [nm] to 80 [nm]. As a result of this, by setting the retardation Rn to be 60% to 90% of the parameter $\beta 1$, it is possible to surely attain the liquid crystal display device 1 with such an excellent viewing angle property that a viewer hardly perceives the coloring and tone degradation when viewing from an oblique direction, maintaining the contrast of a sufficiently high value of 10 or more in practical use when viewed from an oblique direction.

Therefore, in the case where it is placed importance on the improvement in productivity, it is desirable that the retardation Rlc in the thickness direction of the liquid crystal cell 11 is set to fall within the range from 324 [nm] to 396 [nm], and the retardation Rp in the in-plane direction of the positive uniaxial film 14 is set to fall within the range from 30.7 [nm] to 41.7 [nm].

According to this, even in the case where the retardation Rtac changes depending on the variations of the TAC films 12b and 13b caused in the manufacturing process, it is possible to realize the liquid crystal display device 1b with such an excellent viewing angle property as described above, using the positive uniaxial film 14 with the same value of the retardation Rp in the in-plane direction. As a result of this, even in the case of the variations of the TAC films 12b and 13b caused in the manufacturing process, it is possible to fix a type of the positive uniaxial film 14, thus improving the productivity.

Further, in the case where it is placed importance on both the improvement in productivity and more excellent viewing angle property, it is desirable that the retardation Rlc is set to fall within the range from 342 [nm] to 378 [nm], and the retardation Rp is set to fall within the range from 33.3 [nm] to 38.6 [nm]. In this case, the retardation Rp is within the range from 90% to 110% of the parameter $\alpha 1$ under the condition that the retardation Rtac is a general value, i.e., approximately 30 [nm] to 80 [nm]. Therefore, by setting the retardation Rn to fall within the range from 65% to 85% of the parameter $\beta 1$, it is possible to realize the liquid crystal display device 1 having values within the range A2, i.e., the liquid crystal display device 1 with an extremely excellent viewing angle property. Also in this case, even in the case where the retardation Rtac varies depending on the variations of the TAC films 12b and 13b caused in the manufacturing process, it is possible to fix a type of the positive uniaxial film 14, thus improving the productivity.

EXAMPLE 1

In the present example, as the liquid crystal cell 11 prepared were liquid crystal cells with a refractive index anisotropy $\Delta n$ of 0.08 each in the liquid crystal layer 11c, and respective thicknesses (cell thickness dlc) of 3.0 [μm], 4.0 [μm], and 5.0 [μm], i.e., liquid crystal cells with respective retardations Rlc (=dlc·$\Delta n$) in the thickness direction of 240 [nm], 320 [nm], and 400 [nm]. Also, as TAC films 12b and 13b prepared were TAC films with respective retardations Rtac in the thickness direction of 0 [nm], 30 [nm], 50 [nm], and 80 [nm]. Further, for all combinations of the liquid crystal cells 11 with the TAC films 12b and 13b calculated were the respective retardations Rp and Rn where the contrast when viewed from an oblique direction became the maximum. As a result of this, the experimental result shown in FIG. 7 could be obtained.

Figure 7:
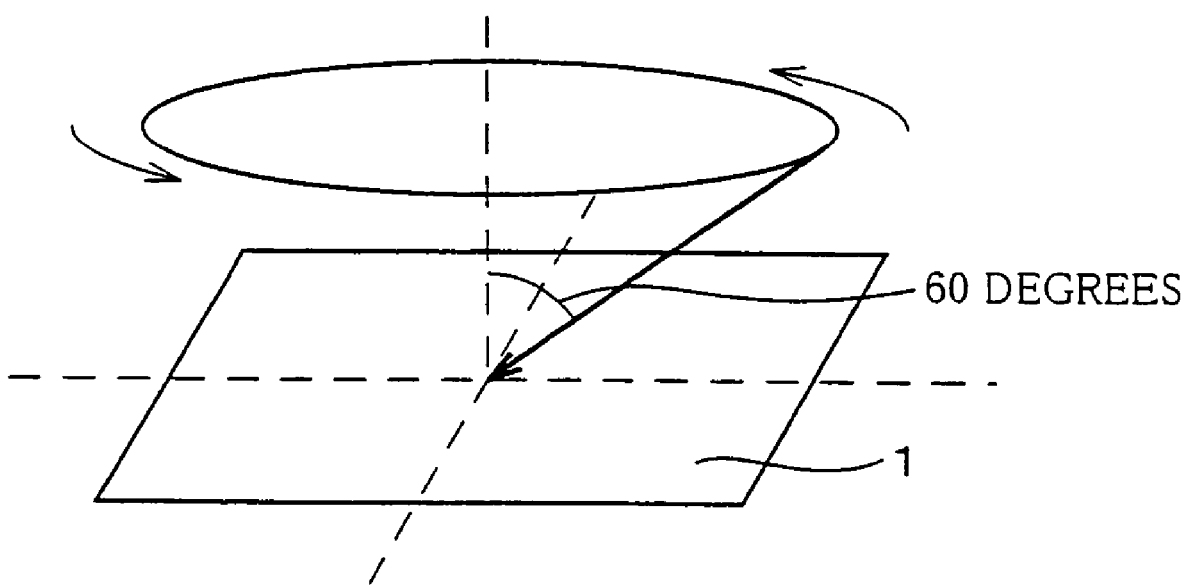
FIG. 7 shows a contrast evaluation method in a liquid crystal display device.

Note that, a viewing angle in the case where the liquid crystal device 1 is actually used is an angle (polar angle) from the normal to the liquid crystal cell 11 in the range from 0 degree to 60 degrees. Because the increase of the polar angle degrades the contrast, the contrast was measured from the direction in which the polar angle is 60 degrees, as shown in FIG. 7. Further, the contrast was measured at an azimuth (in-plane direction) of 45 degrees with reference to the absorption axes AA12 and AA13 of the polarizing films 12a and 13a because the contrast becomes the minimum at the azimuth of 45 degrees with reference to the absorption axes AA12 and AA13.

As result of this, in the arrangement in which the positive uniaxial film 14 was layered between the negative uniaxial film 15 and the liquid crystal cell 11, as shown in FIG. 1, it was confirmed that the liquid crystal display device 1 with the maximum contrast could be attained under the condition that the retardation Rp in the in-plane direction of the positive uniaxial film 14 was equal to the foregoing parameter $\alpha 1$ and the retardation Rn in the thickness direction of the negative uniaxial film 15 was equal to the foregoing parameter $\beta 1$. Further, the foregoing expressions (3) and (4) could be calculated from the experimental result.

Further, it was confirmed that in the case of the liquid crystal cells 11 prepared above, using the above-prepared general TAC films 12b and 13b (Rtac=30, 50, 80 [nm]), the optimal value of the retardation Rp in the in-plane direction of the positive uniaxial film 14 was from 35 to 49 [nm], and in the case where the thickness of the liquid crystal cell 11 was 3.0 [μm] and 4.0 [μm], that is, in the case where the retardation Rlc in the thickness direction of the liquid crystal cell 11 was 240 [nm] and 320 [nm], the optimal value of the retardation Rp increased with the increase in the retardation Rtac. It was also confirmed that in the case where the thickness of the crystal cell 11 was 5.0 [μm] (the retardation Rlc was 400 [nm]), the optimal value of the retardation Rp decreased with the increase in the retardation Rtac.

Further, by setting the retardation Rlc in the thickness direction of the liquid crystal cell 11 to 360 [nm], it was confirmed that the retardation Rp where the contrast became the maximum when viewed from the foregoing oblique direction is approximately constant in spite of the change in the retardation Rtac.

In addition, with changes in the retardations Rp and Rn by 5% each at a time, a viewer from the oblique direction estimated the coloring and tone degradation caused in each of the liquid crystal display devices 1. Specifically, the viewer from the oblique direction judged, as the presence or absence of a coloring phenomenon, whether there occurred the phenomenon that white shifted to yellow or a bluish color, and judged, as the presence or absence of tone degradation, whether there occurred the phenomenon that tone degradation in bright regions deteriorated the expressiveness of images.

According to this judgment, it was confirmed that even in the case where the retardation Rlc in the thickness direction of the liquid crystal cell 11 and the retardation Rtac of the TAC films 12b and 13b had any of the foregoing values, the contrast from the oblique direction (at the polar angle of 60 degrees) was above 10, maintaining a sufficient contrast in practical use, under the condition that the retardation Rp was a value of not less than 80% nor more than 120% of the parameter $\alpha 1$, and the retardation Rn was a value not less than 60% nor more than 90% of the parameter $\beta 1$. Further, it was confirmed that when the retardations Rp and Rn were set to the foregoing ranges, the liquid crystal display device 1 indicated such an excellent viewing angle property that the viewer hardly perceived the coloring and tone degradation when viewing from the oblique direction. Further, in the case where the retardation Rp was smaller than 80% or greater than 120% of the parameter $\alpha 1$, and in the case where the retardation Rn was smaller than 60% or greater than 90% of the parameter $\beta 1$, it was clearly confirmed by the viewer from the oblique direction that there occurred the coloring phenomenon that white shifted to yellow or a bluish color, or the phenomenon that tone degradation in bright regions deteriorated the expressiveness of images, and it was confirmed as well that the coloring and tone degradation was not tolerable for the viewer.

In addition, it was confirmed that even in the case where the retardation Rlc in the thickness direction of the liquid crystal cell 11 and the retardation Rtac of the TAC films 12b and 13b had any of the foregoing values, less coloring and tone degradation was found by the viewer from the oblique direction under the condition that the retardation Rp was a value not less than 90% nor more than 110% of the parameter $\alpha 1$ and the retardation Rn was a value not less than 65% nor more than 85% of the parameter $\beta 1$ than the condition that the retardation Rp was a value ranging from 80% to 90% or from 110% to 120% of the parameter $\alpha 1$ and the retardation Rn was a value ranging from 60% to 65% or from 85% to 90% of the parameter $\beta 1$.

Under the condition that the retardation Rp was a value not less than 90% not more than 110% of the parameter $\alpha 1$ and the retardation Rn was a value not less than 65% nor more than 85% of the parameter $\beta 1$, it was confirmed that the effect of the improvement in the coloring and tone degradation was substantially saturated, and a plurality of liquid crystal display devices 1 with the respective Rp and Rn set to the above range could obtain similarly excellent display quality level so that the viewer from the oblique direction could not recognize the differences in the coloring and tone degradation from the liquid crystal display devices 1.

Note that, it was confirmed that the center value of the retardation Rp in the range A2 was a value of 100% of the retardation Rp that maximized the contrast from the oblique direction (=the parameter $\alpha 1$) (a value equal to the parameter $\alpha 1$). Meanwhile, it was also confirmed that the center value of the retardation Rn in the range A2 was 75% of the retardation Rn that maximized the contrast from the oblique direction (=the parameter β1), and the coloring phenomenon and the tone degradation could be improved under the condition that the retardation Rn in the thickness direction of the negative uniaxial film 15 was set to be a value smaller than the parameter β1 where the contrast became the optimal.

Also, it was confirmed that the condition that the retardation Rp was set to fall within the range from 80% to 120% of the parameter α1, and the retardation Rn was set to fall within the range from 85% to 90% of the parameter β1 could limit the coloring and tone degradation within allowable limits as well as enhance the contrast, as compared with the condition set to fall within the range A2.

Further, by setting the retardation Rlc of the liquid crystal cell 11 to be in the range from 324 [nm] to 396 [nm] and setting the retardation Rp in the in-plane direction of the positive uniaxial film 14 to be in the range from 30.7 [nm] to 41.7 [nm], it was confirmed that the contrast when the liquid crystal display device 1 was viewed from an oblique direction was above 10 under the condition that the retardation Rtac was a general value, and that the viewer from the oblique direction hardly perceives the coloring and tone degradation. Also, it was confirmed that in terms of coloring and tone degradation, the viewer from an oblique direction could not recognize the differences from the liquid crystal display devices 1 with the values of the retardations Rp and Rn within the range A2 under the condition that the retardation Rlc was in the range from 342 [nm] to 378 [nm], and the retardation Rp was in the range from 33.3 [nm] to 38.6 [nm].

SECOND EMBODIMENT

A liquid crystal display device 1a according to the present embodiment has an arrangement similar to that of the liquid crystal display device 1 shown in FIG. 1. However, instead of the positive uniaxial film 14 and the negative uniaxial film 15, a biaxial film (phase difference film) 16 is layered between the liquid crystal cell 11 and the polarizing plate 12 shown in FIG. 8.

The biaxial film 16 is an optically anisotropic film having the property of nx2>ny2>nz2, where nx2 and ny2 are refractive indexes in the in-plane direction of the film, and nz2 is a refractive index in the normal direction. Let a film thickness be d2, retardation Rxy in the in-plane direction and retardation Rz in the thickness direction can be calculated by the following respective expressions (5) and (6):

$$Rxy=d2 \cdot (nx2-ny2) \quad (5)$$

$$Rz=d2 \cdot \{(nx2+ny2)/2-nz2\} \quad (6)$$

Further, the biaxial film 16 is disposed so that its in-plane retardation axis SL16 is orthogonal to the absorption axis AA12 of the polarizing plate 12 at the same side when viewed from the liquid crystal cell 11.

Also in such a case, in the case where a liquid crystal cell 11 in which liquid crystal molecules are vertically oriented is viewed from an oblique direction, the biaxial film 16 compensates the phase difference that the liquid crystal cell 11 brings to transmitting light. Therefore, if the retardation of the biaxial film 16 is properly set, the contrast when viewed from an oblique direction can be enhanced.

Further, in the liquid crystal display device 1a according to the present embodiment, the retardation of the biaxial film 16 is set as described below, in order to attain a liquid crystal display device which characterizes excellent color and gradation, maintaining a sufficiently high contrast in practical use, as a display quality level when viewed obliquely; more specifically, in order to attain a liquid crystal display device such that a viewer hardly perceives the coloring and tone degradation when viewing from an oblique direction, keeping the contrast of a sufficiently high value of 10 or more in practical use when viewed from an oblique direction.

Specifically, when retardation Rtac [nm] in the thickness direction of the TAC films 12b and 13b and a parameter α2 [nm] in relation to the retardation Rxy in the in-plane direction are expressed by the following expression (7):

$$\alpha2=85-0.09 \times Rlc - Rtac/20 \quad (7),$$

the retardation Rxy in the in-plane direction of the biaxial film 16 is set to fall within the range from not less than 80% to not more than 120% of the parameter α2.

Further, when retardation Rlc [nm] in the thickness direction of the liquid crystal cell 11 and a parameter β2 [nm] in relation to the retardation Rz are expressed by the following expression (8):

$$\beta2=1.05 \times Rlc - 1.9 \times Rtac \quad (8),$$

the retardation Rz in the thickness direction of the biaxial film 16 is set to fall within the range from not less than 60% to not more than 90% of the parameter β2.

Figure 9:
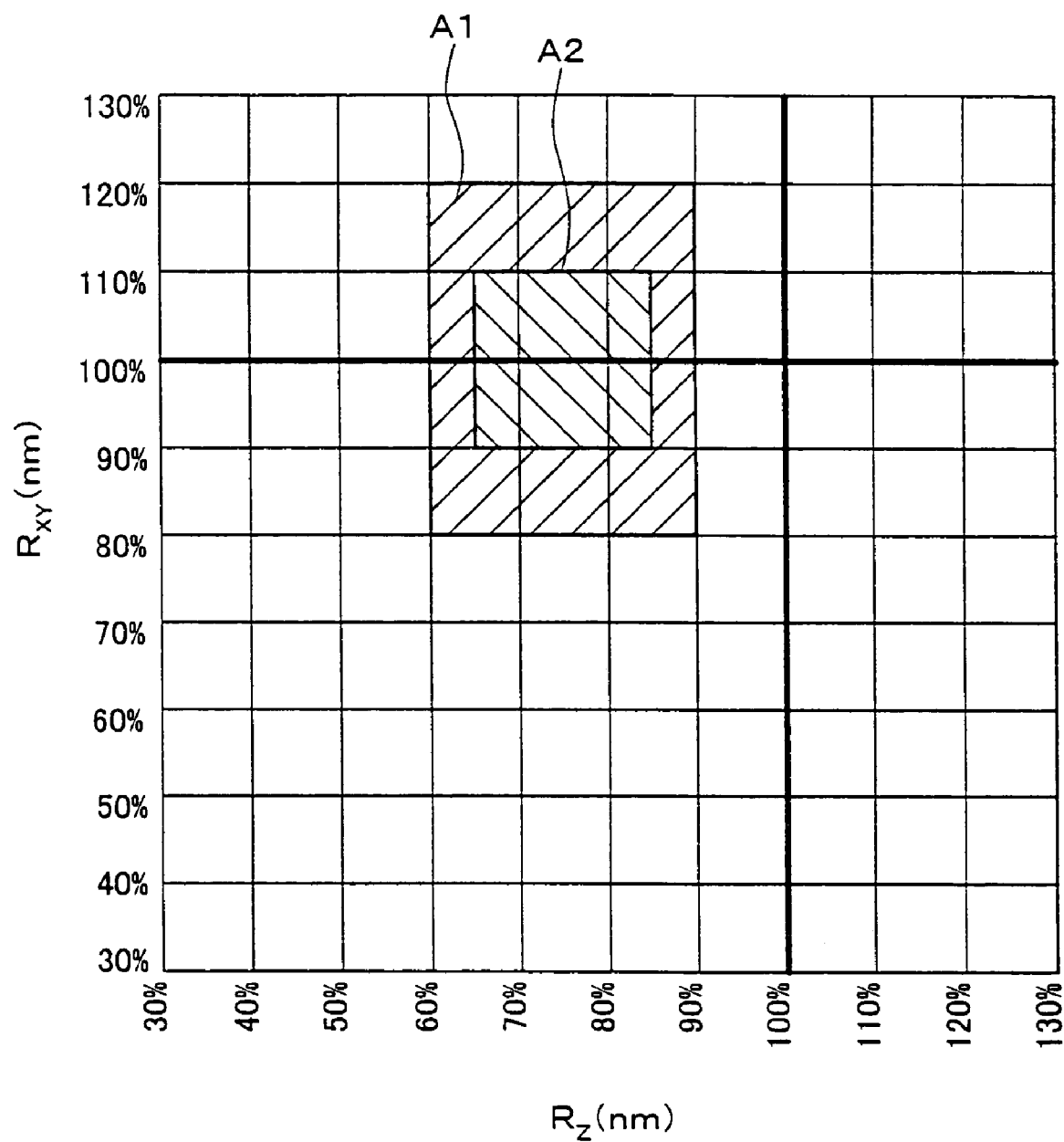
FIG. 9 shows preferable ranges for retardations in the in-plane direction and thickness direction of a biaxial film which is provided in the liquid crystal display device, where the retardations are expressed by relative values to the respective parameters.

Thus, by setting the retardations Rxy and Rz to fall within the range A1 shown in FIG. 9 with reference to the parameters α2 and β2, it is possible to surely attain the liquid crystal display device 1a with such an excellent viewing angle property that a viewer hardly perceives the coloring and tone degradation when viewing from an oblique direction, maintaining the contrast of a sufficiently high value of 10 or more in practical use when viewed from an oblique direction.

Further, less coloring and tone degradation found by the viewer occur in the inner part than in the peripheral part of the range A1. Especially, as in the range A2 shown in FIG. 9, by setting the retardation Rxy to be not less than 90% nor more than 110% of the parameter α2 as well as by setting the retardation Rz to fall within the range from not less than 65% to not more than 85% of the parameter β2, it is possible to realize the liquid crystal display device 1a with more excellent viewing angle property.

Note that, when the retardations Rxy and Rz are set to fall within the range A2, the improvement in the coloring and tone degradation more than that obtained when those are set to fall within the range A1 is not recognized by the viewer, and the improvement in the coloring and tone degradation is substantially saturated. Therefore, by setting the retardations Rxy and Rz to be in the range A2, it is possible to realize the liquid crystal display device 1a with such an excellent display quality level. Further, when the retardations Rxy and Rz are respectively set to the same values of the parameters α2 and β2, the contrast when viewed from an oblique direction becomes the maximum. Still further, the retardations Rxy and Rz respectively set to the values ranging from 80% to 120% of the parameter α2 and 85% to 90% of the parameter β2 can suppress the occurrence of the coloring and tone degradation within allowable limits as well as enhance the contrast, as compared with the case where the retardations Rxy and Rz are set to fall within the range A2.

Figure 8:
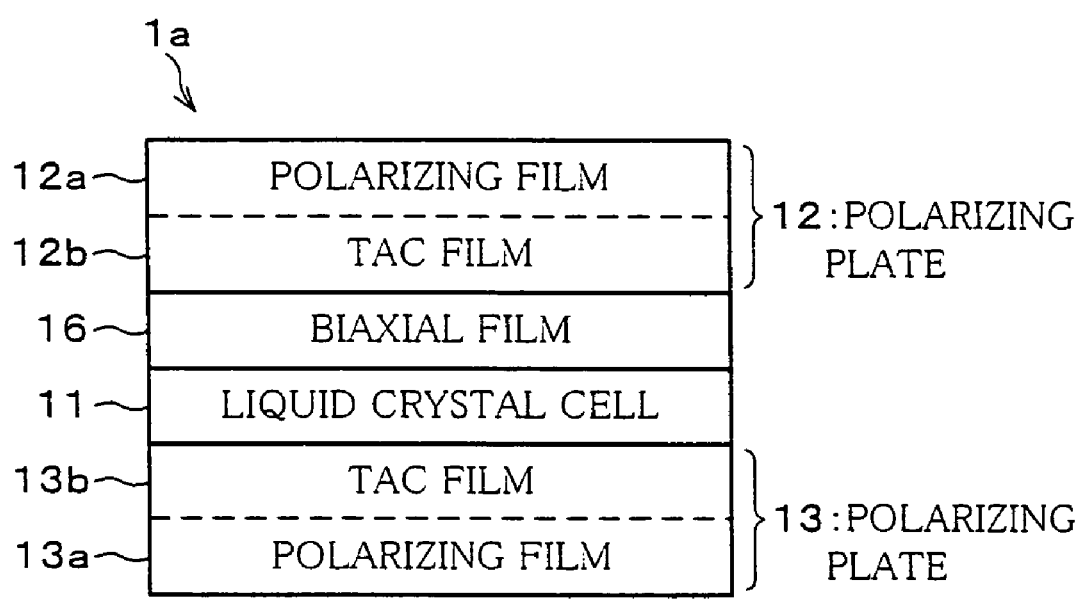
FIG. 8 is a schematic diagram showing the main arrangement of a liquid crystal display device according to another embodiment of the present invention.
Figures 10, 11:
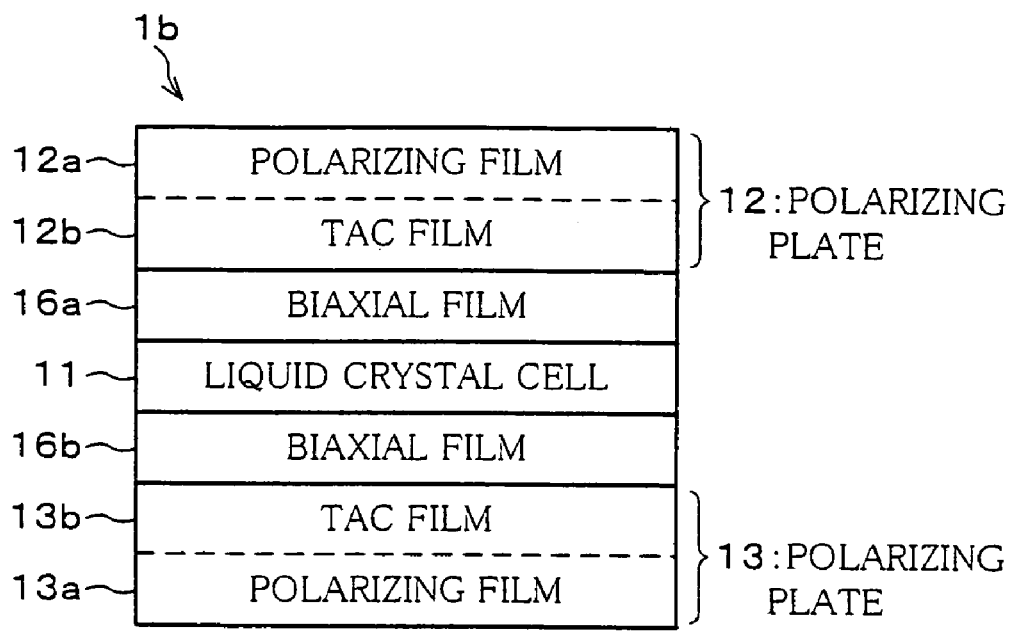
FIG. 10 is a schematic diagram showing the main arrangement of a liquid crystal display device which is a modified example of the foregoing liquid crystal display device.
FIG. 11 shows experimental results of optimal values for the retardations with respect to the combination of a liquid crystal cell with a polarizing plate in an example of the present invention.

As a liquid crystal display device 1b shown in FIG. 10, biaxial films 16a and 16b into which the biaxial film 16 shown in FIG. 8 is divided may be disposed on the two sides of the liquid crystal cell 11, respectively. Note that, in this case, the biaxial films 16a and 16b respectively correspond to first and second phase difference films recited in the claims.

In this case, the biaxial film 16a is disposed so that its retardation axis SL16a in the in-plane direction is orthogonal to the absorption axis AA12 of the polarizing plate 12 at the same side when viewed from the liquid crystal cell 11. Similarly, the biaxial film 16b is disposed so that its retardation axis SL16b is orthogonal to the absorption axis AA13 of the polarizing plate 13 at the same side when viewed from the liquid crystal cell 11. Also in this case, the same effect can be obtained by setting each of the retardations Rxya and Rxyb in the in-plane direction of the respective biaxial films 16a and 16b to be half of the retardation Rxy in the in-plane direction of the biaxial film 16 and setting each of the retardations Rza and Rzb in the thickness direction of the respective biaxial films 16a and 16b to be half of the retardation Rz in the thickness direction of the biaxial film 16.

Specifically, when retardation Rtac [nm] in the thickness direction of the TAC films 12b and 13b and a parameter α3 [nm] in relation to the retardations Rxya and Rxyb in the in-plane direction are expressed by the following expression (9):

$$\alpha 3 = 42.5 - 0.045 \times Rlc - Rtac/40 \quad (9),$$

each of the retardations Rxya and Rxyb in the in-plane direction of the respective biaxial films 16a and 16b are set to fall within the range from not less than 80% to nor more than 120% of the parameter α3.

Further, when retardation. Rlc [nm] in the thickness direction of the liquid crystal cell 11 and a parameter β3 [nm] in relation to the retardations Rza and Rzb are expressed by the following expression (10):

$$\beta 3 = 0.525 \times Rlc - 0.95 \times Rtac \quad (10),$$

each of the retardations Rza and Rzb in the thickness direction of the respective biaxial films 16a and 16b are set to fall within the range from not less than 60% to not more than 90% of the parameter β3.

As in the case of the liquid crystal display device 1a, this makes it possible to surely attain the liquid crystal display device 1b with such an excellent viewing angle property that a viewer hardly perceives the coloring and tone degradation when viewing from an oblique direction, maintaining the contrast of a sufficiently high value of 10 or more in practical use when viewed from an oblique direction.

Further, as in the case of the liquid crystal display device 1a, less coloring and tone degradation found by the viewer occur in the inner part than in the peripheral part of the range A1. Especially, as in the range A2 shown in FIG. 9, by setting the retardations Rxya and Rxyb to be not less than 90% nor more than 110% of the parameter α3 as well as by setting the retardations Rza and Rzb to be not less than 65% nor more than 85% of the parameter β3, it is possible to realize the liquid crystal display device 1b with more excellent viewing angle property.

Note that, as in the case of the liquid crystal display device 1a, when the retardations Rxya and Rxyb and the retardations Rza and Rzb are set to fall within the range A2, the improvement in the coloring and tone degradation more than that obtained when those are set to fall within the range A1 is not recognized by the viewer, and the improvement in the coloring and tone degradation is substantially saturated. Therefore, by setting the retardations Rxya and Rxyb and the retardations Rza and Rzb to be in the range A2, it is possible to realize the liquid crystal display device 1b with such an excellent display quality level. Further, when the retardations Rxya and Rxyb and the retardations Rza and Rzb are respectively set to the same values of the parameters α3 and β3, the contrast when viewed from an oblique direction becomes the maximum. Still further, the retardations Rxya and Rxyb and the retardations Rza and Rzb respectively set to the values ranging from 80% to 120% of the parameter α3 and 85% to 90% of the parameter β3 can suppress the occurrence of the coloring and tone degradation within allowable limits as well as enhance the contrast, as compared with the case where the retardations Rxy and Rz are set to fall within the range A2.

EXAMPLE 2

In the present example, the same liquid crystal cells 11 and the TAC films 12b and 13b were prepared as in the Example 1. For all combinations of the liquid crystal cells 11 with the TAC films 12b and 13b calculated were the respective retardations Rxy and Rz where the contrast when viewed from the same oblique direction as that in Example 1 became the maximum. According to this, the experimental result shown in FIG. 11 could be obtained.

As shown in FIG. 8, in the arrangement in which the biaxial film 16 was layered between one of the polarizing plates 12 and 13 (the polarizing plate 12 in FIG. 12) and the liquid crystal cell 11, it was confirmed that the liquid crystal display device 1a with the maximum contrast could be attained under the condition that the retardation Rxy in the in-plane direction of the biaxial film 16 was equal to the foregoing parameter α2 and the retardation Rz in the thickness direction of the biaxial film 16 was equal to the foregoing parameter β2. Further, by approximating the experimental result with a linear expression, the foregoing expressions (7) and (8) could be calculated.

Further, it was confirmed that in the case of the liquid crystal cells 11 prepared above, using the above-prepared general TAC films 12b and 13b (Rtac=30, 50, 80 [nm]), the optimal value of the retardation Rxy in the in-plane direction was from 45 to 65 [nm], and although the retardation Rtac was a retardation in the thickness direction, the retardation Rtac was influential to the retardation Rxy in the in-plane direction of the biaxial film 16, and it was impossible to easily handle the influence of the TAC films 12b and 13b.

In addition, with changes in the retardations Rxy and Rz by 5% each at a time, a viewer from the oblique direction estimated the coloring and tone degradation caused in each of the liquid crystal display devices 1. Specifically, the viewer from the oblique direction judged, as the presence or absence of a coloring phenomenon, whether there occurred the phenomenon that white shifted to yellow or a bluish color, and judged, as the presence or absence of tone degradation, whether there occurred the phenomenon that tone degradation in bright regions deteriorated the expressiveness of images.

According to this judgment, it was confirmed that even in the case where the retardation Rlc in the thickness direction of the liquid crystal cell 11 and the retardation Rtac of the TAC films 12b and 13b had any of the foregoing values, the contrast from the oblique direction (at the polar angle of 60 degrees) was above 10, maintaining a sufficient contrast in practical use, under the condition that the retardation Rxy was a value of not less than 80% nor more than 120% of the parameter α2, and the retardation Rz was a value not less than 60% nor more than 90% of the parameter β2. Further, it was confirmed that when the retardations Rxy and Rz were set to the foregoing ranges, the liquid crystal display device 1a indicated such an excellent viewing angle property that the viewer hardly perceived the coloring and tone degradation when viewing from the oblique direction. Further, in the case where the retardation Rxy was smaller than 80% or greater than 120% of the parameter α2, and in the case where the retardation Rz was smaller than 60% or greater than 90% of the parameter β2, it was clearly confirmed by the viewer from the oblique direction that there occurred the coloring phenomenon that white shifted to yellow or a bluish color, or the phenomenon that tone degradation in bright regions deteriorated the expressiveness of images, and it was confirmed as well that the coloring and tone degradation was not tolerable for the viewer.

In addition, it was confirmed that even in the case where the retardation Rlc in the thickness direction of the liquid crystal cell 11 and the retardation Rtac of the TAC films 12b and 13b had any of the foregoing values, less coloring and tone degradation was found by the viewer from the oblique direction under the condition that the retardation Rxy was a value not less than 90% nor more than 110% of the parameter α2 and the retardation Rz was a value not less than 65% nor more than 85% of the parameter β2 than the condition that the retardation Rxy was a value ranging from 80% to 90% or from 110% to 120% of the parameter α2 and the retardation Rz was a value ranging from 60% to 65% or from 85% to 90% of the parameter β2.

Under the condition that the retardation Rxy was a value not less than 90% not more than 110% of the parameter α2 and the retardation Rz was a value not less than 65% nor more than 85% of the parameter β2, it was confirmed that the effect of the improvement in the coloring and tone degradation was substantially saturated, and a plurality of liquid crystal display devices 1a with the respective Rxy and Rz set to fall within the above range could obtain similarly excellent display quality level so that the viewer from the oblique direction could not recognize the differences in the coloring and tone degradation from the liquid crystal display devices 1a.

Note that, it was confirmed that the center value of the retardation Rxy in the range A2 was a value of 100% of the retardation Rxy that maximized the contrast from the oblique direction (=the parameter α2) (a value equal to the parameter α2). Meanwhile, it was also confirmed that the center value of the retardation Rz in the range A2 was 75% of the retardation Rz that maximized the contrast from the oblique direction (=the parameter β2), and the coloring phenomenon and the tone degradation could be improved under the condition that the retardation Rz in the thickness direction of the biaxial film 16 was set to be a value smaller than the parameter β2 where the contrast became the optimal.

Also, it was confirmed that the condition that the retardation Rxy was set to fall in the range from 80% to 120%, and the retardation Rz was set to fall in the range from 85% to 90% could suppress the coloring and tone degradation within allowable limits as well as enhance the contrast, as compared with the condition set to fall within the range A2.

Also in the arrangement in which the biaxial film 16 was divided into two films, as the liquid crystal display device 1b shown in FIG. 10, it was confirmed that even when the retardations Rlc and Rtac were any of the foregoing values, each of the retardations Rxya, Rxyb, Rza, and Rzb for obtaining the maximum contrast at the oblique viewing angle (polar angle of 60 degrees) were half of the values in the liquid crystal display device 1a shown in FIG. 11, and that with reference to the parameters α3 and β3, instead of α2 and β2, it is possible to obtain the same effect in the same range as the liquid crystal display device 1a. Specifically, by setting the retardations Rxya and Rxyb to be in the range from 80% to 120% of the parameter α3 and setting the retardations Rza and Rzb to be in the range from 60% to 90% of the parameter β3, it was confirmed that it is possible to suppress the coloring and tone degradation within allowable limits when viewed at the oblique viewing angle (polar angle of 60 degrees). Further, by setting the retardations Rxya and Rxyb to be in the range from 90% to 110% of the parameter α3 and setting the retardations Rza and Rzb to be in the range from 65% to 85% of the parameter β3, it was confirmed that the improvement in the coloring and tone degradation is saturated at the oblique viewing angle, and it is possible to obtain the liquid crystal display device 1b with similarly excellent display quality level. Still further, by setting the retardations Rxya and Rxyb to be in the range from 80% to 120% of the parameter α3 and setting the retardations Rza and Rzb to be in the range from 85% to 90% of the parameter β3, it was confirmed that it is possible to enhance the contrast, suppressing the coloring and tone degradation within allowable limits when viewed at the oblique viewing angle.

Note that, explained in the foregoing first and second embodiments is the case where the orientation direction of the liquid crystal molecules in the pixel is divided into four directions in the liquid crystal cell 11 arranged as shown in FIGS. 2 though 4. However, the present invention is not limited to this. For example, other structures, such as structures shown in FIGS. 12 and 13, in which the orientation direction is divided into four directions, can also obtain the same effect.

Figure 12:
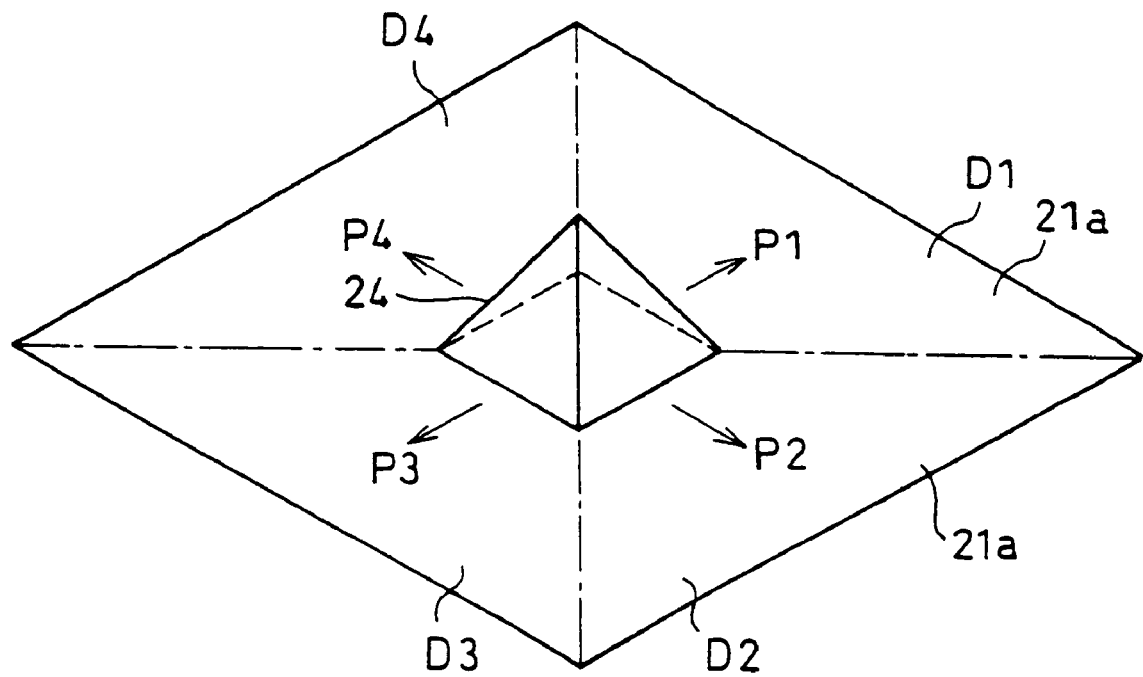
FIG. 12 is a perspective view showing a pixel electrode of a liquid crystal cell in another arrangement example of the foregoing liquid crystal display devices.

More specifically, a liquid crystal cell using a pixel electrode 21a shown in FIG. 12 is provided with a quadrangular pyramid-shaped protrusion 24 formed on the pixel electrode 21a, instead of the protrusions 23a and 23b shown in FIG. 4. Note that, the protrusion 24, as the protrusions 23a, can be formed by the application of a photosensitive resin on the pixel electrode 21a and the process of photolithography.

Also in this arrangement, the liquid crystal molecules near the protrusion 24 are oriented so as to be vertical to each of the slopes. In addition, when a voltage is applied, the electric filed in the part of the protrusion 24 tilts in the parallel direction to the slope of the protrusion 24. As a result of these, when a voltage is applied, the in-plane component of the orientation angle in the liquid crystal molecules is equal to the in-plane component in the normal direction to the slope that is the nearest to the liquid crystal molecules (directions P1, P2, P3 or P4). Therefore, the pixel region is divided into four domains D1 to D4 of mutually different orientation directions when the liquid crystal molecules tilt. As a result of this, it is possible to obtain the same effect as that of the liquid crystal cell 11 with the structure shown in FIGS. 2 through 4.

Note that, in the case where a large-size liquid crystal television such as a 40-inch liquid crystal television, for example, is manufactured, the size of each pixel becomes as large as 1 mm square, and one protrusion 24 alone provided each on the pixel electrode 21a produces week orientation control force, which may cause an unstable orientation. Thus, as in this case, in the case where orientation control force is insufficient, it is desirable that a plurality of protrusions 24 are provided on each of the pixel electrode 21a.

Figure 13:
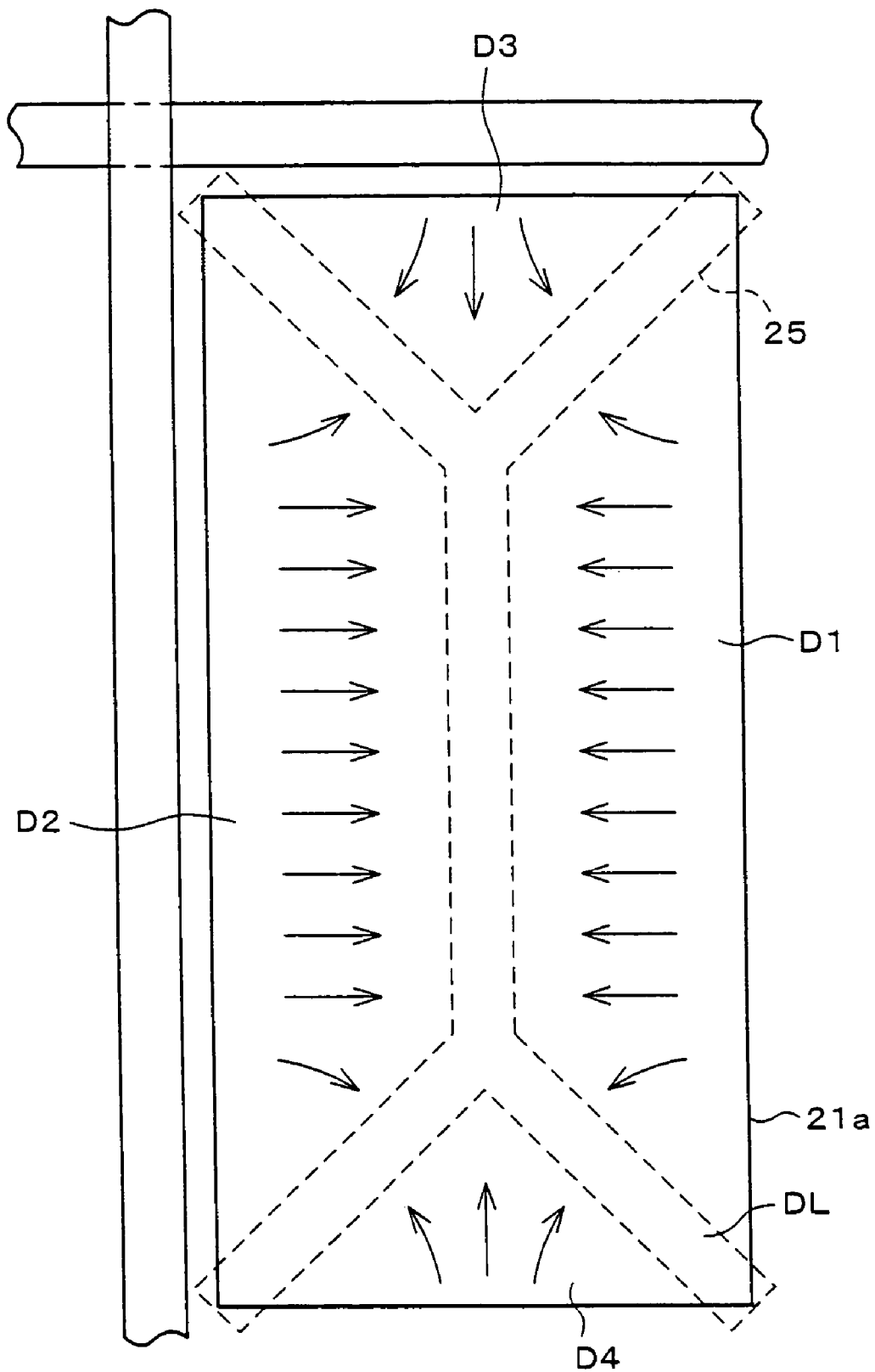
FIG. 13 is a plan view showing the vicinity of a pixel electrode in a liquid crystal cell in still another arrangement example of the foregoing liquid crystal display devices.

Further, a multi-domain vertical alignment can be also realized with the arrangement in which an orientation control window 25 where Y-shaped slits are connected symmetrically in the up-and-down direction (the in-plane direction that is parallel to any of the sides of the substantially square pixel electrode 21a) is provided on the counter electrode 21b of the counter substrates 11b, for example, as shown in FIG. 13.

When a voltage is applied, the foregoing arrangement does not produce enough electric field to tilt the liquid crystal molecules in the region right below the orientation control window 25, of the surface area of the counter substrate 11b, and the liquid crystal molecules are vertically oriented. On the other hand, in the region surrounding the orientation control window 25, of the surface area of the counter substrate 11b, as it goes close to the counter substrate 11b, an electric field spreads so as to escape from the orientation control window 25. Here, the long axes of the liquid crystal molecules tilt in the vertical direction to the electric field, and the in-plane component in the orientation direction of the liquid crystal molecules become substantially vertical to each side of the orientation control window 25, as indicated by arrows in FIG. 13. Therefore, also in this arrangement, the orientation direction of the liquid crystal molecules in the pixel can be divided into four directions, and it is possible to obtain the same effect as that of the liquid crystal cell 11 with the structure shown in FIGS. 2 though 4.

Further, explained in the above description is the case where the orientation direction is divided into four directions. The structure using a radial alignment liquid crystal cell 11, as shown in FIGS. 14 and 15, can also obtain the same effect.

Figure 14:
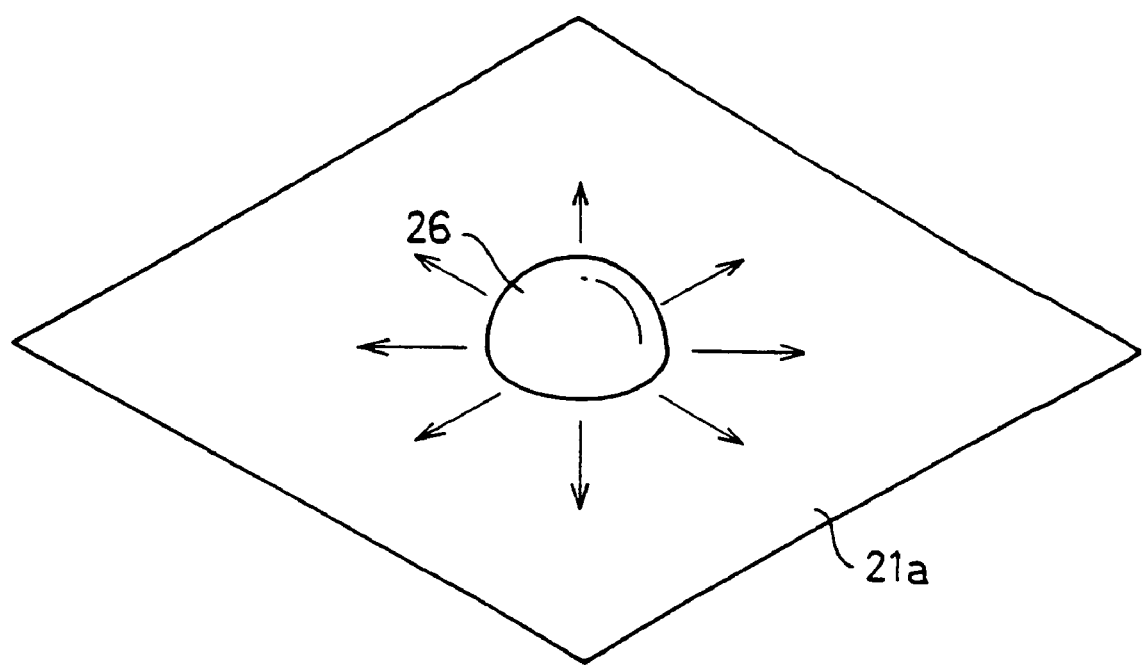
FIG. 14 is a perspective view showing a pixel electrode of a liquid crystal cell in yet another arrangement example of the foregoing liquid crystal display devices.
Figure 16:
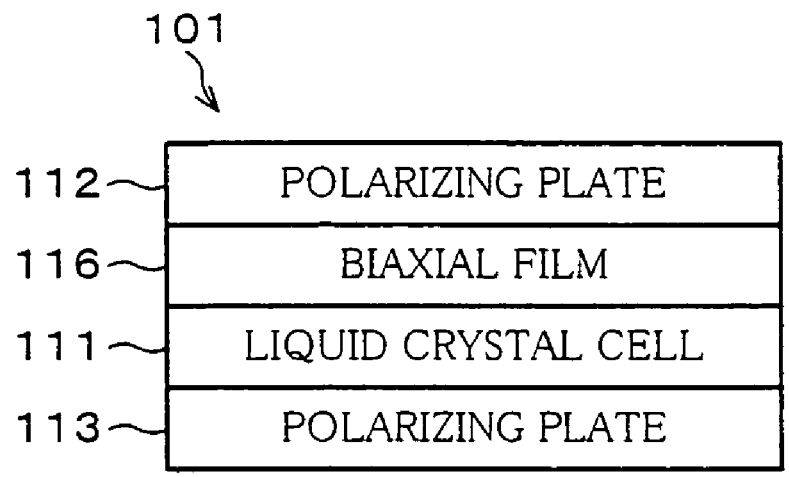
FIG. 16 is a schematic diagram showing the main arrangement of a liquid crystal display device with a conventional art.
Figure 17:
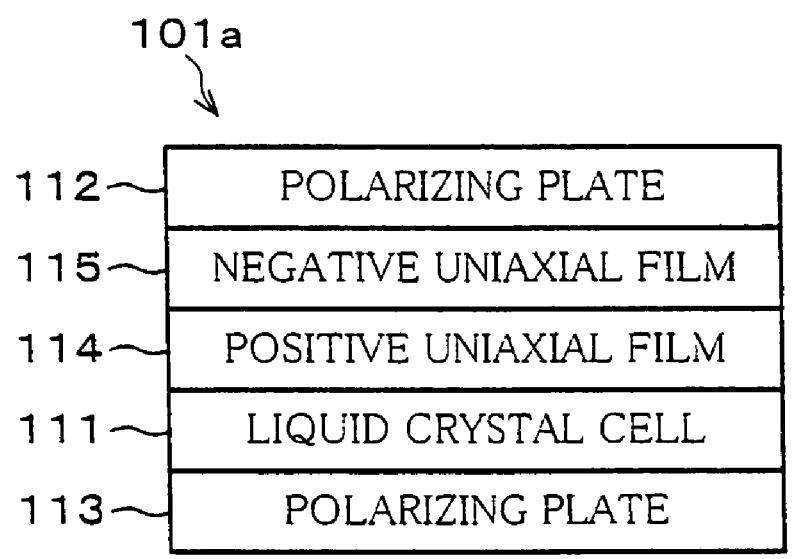
FIG. 17 is a schematic diagram showing the main arrangement of a liquid crystal display device with another conventional art.

More specifically, in the structure shown in FIG. 14, instead of the protrusion 24 shown in FIG. 12, a substantially hemispherical protrusion 26 is provided. Also in this case, the liquid crystal molecules near the protrusion 26 are oriented so as to be vertical to the surface of the protrusion 26. In addition, when a voltage is applied, an electric field in the part of the protrusion 26 tilts in the parallel direction to the surface of the protrusion 26. From these results, the liquid crystal molecules, in tilting when a voltage is applied, tend to tilt in a radial pattern about the protrusion 26 in the in-plane direction, and the liquid crystal molecules in the liquid crystal cell 11 can tilt and orient in a radial pattern. Note that, the protrusion 26 can be formed in the same process as that of the protrusion 24. Further, as the protrusion 24, in the case where orientation control force is insufficient, it is desirable that a plurality of protrusions 26 are provided on each of the pixel electrodes 21a.

In the structure shown in FIG. 15, instead of the protrusion 24 shown in FIG. 12, a circular slit 27 is provided to the pixel electrode 21a. When a voltage is applied, this arrangement does not produce enough electric field to tilt the liquid crystal molecules in the region right on the slit 27, of the surface of the pixel electrode 21a. Therefore, in this region, even when a voltage is applied, the liquid crystal molecules are oriented vertically. On the other hand, in the region near the slit 27, of the surface of the pixel electrode 21a, as it gets close to the slit 27 in the thickness direction, the electric field spreads obliquely so as to escape from the slit 27. Here, the long axes of the liquid crystal molecules tilt in the vertical direction. According to the continuity of liquid crystal, the liquid crystal molecules away from the slit 27 are also oriented in the same direction. Thus, when a voltage is applied to the pixel electrode 21a, the liquid crystal molecules can be oriented so that the in-plane components of the orientation direction spread in a radial pattern about the slit 27 as indicated by arrows in FIG. 15, that is, the liquid crystal molecules can be oriented symmetrically to the center of the slit 27. Here, since the tilt of the electric field varies depending on applied voltage, a substrate's normal direction component (tilt angle) in the orientation direction of the liquid crystal molecules can be controlled by applied voltage. Note that, since the increase in applied voltage increases a tilt angle to the substrate's normal direction, the liquid crystal molecules are oriented substantially in parallel with a display screen as well as in a radial pattern in a plane. Further, as the protrusion 26, in the case where orientation control force is insufficient, it is desirable that a plurality of slits 27 are provided on each of the pixel electrodes 21a.

Incidentally, explained in the above description is the case where the orientation direction of the liquid crystal molecules in the pixel is divided. However, a liquid crystal cell without orientation division (a mono-domain liquid crystal cell) can also obtain the same effect.

In this case, the pixel electrode 21a and the counter electrode 21b, which are not provided with the protrusions 23a and others, are formed evenly. In the mono-domain vertical alignment liquid crystal cell, unlike a multi-domain vertical alignment or radial tilt alignment liquid crystal cell, a rubbing process is included in the manufacturing process, and rubbing directions of the liquid crystal molecules in the liquid crystal layer 11c are set so as not to be parallel between the substrates 11a and 11b. The liquid crystal cell 11 and the polarizing plate 12 and 13 are disposed so that the rubbing direction forms an angle of 45 degrees with the absorption axes AA12 and AA13 of the respective polarizing plates 12 and 13. Also in this case, when no voltage is applied, the liquid crystal molecules in the pixel are oriented in the substrate's normal direction (in the vertical direction), as in the case of FIG. 2. Therefore, it is possible to obtain the same effect by using the same polarizing plates 12 and 13 and phase difference plates (14 to 16, 16a and 16b) as those in the above embodiments.

Incidentally, according to the liquid crystal display devices 1 and 1a shown in FIGS. 1 and 8, respectively, the optical properties of members disposed from the liquid crystal cell 11 to the polarizing plate 12 on one side are not equal to those of members disposed from the liquid crystal cell 11 to the polarizing plate 13 on the other side, so that there is the possibility that the contrast when the liquid crystal cell 11 is viewed from an azimuth on the left side may be different from that viewed from an azimuth on the right side, and the contrast when the liquid crystal cell 11 is viewed from an azimuth on the upper side may different from that viewed from an azimuth on the bottom side. Therefore, in the case where these liquid crystal display devices 1 and 1a requires the viewing angle property balanced in the left, right, upper, and bottom directions, it is desirable to use a liquid crystal cell in which the orientation direction of the liquid crystal molecules in each pixel is divided into four or more directions, such as four division alignment liquid crystal cells and radial alignment liquid crystal cells.

Further, as an example explained in the above description is the case where the liquid crystal cell 11 has the liquid crystal layer 11c with a negative dielectric anisotropy; however, the present invention is not limited to this. The liquid crystal cell 11 having the liquid crystal layer 11c with a positive dielectric anisotropy can also obtain the same effect, provided that the liquid crystal cell is the one in which the liquid crystal molecules are oriented vertically to the substrate of the liquid crystal cell 11 in black displaying, as the structure in FIG. 2.

In this case, an electric field is applied to the liquid crystal layer 11c in the parallel direction to substrates by using an electrode that produces an electric field in the parallel direction to substrates, as an electrode of a comblike structure which is used in the IPS (In-Plane Switching) mode. Also in this case, when no voltage is applied (when there is no electric field), the liquid crystal molecules in the pixel are oriented in the vertical direction to the substrates, as the structure in FIG. 2. Therefore, it is possible to obtain the same effect by using the same polarizing plates 12 and 13 and the phase difference plates (14 to 16, 16a and 16b) as those in the above embodiments.

As described above, a liquid crystal display device of the present invention has an arrangement in which when a parameter α [nm] in relation to Rp is: α=35+(Rlc/80−4)²× 3.5+(360−Rlc)×Rtac/850; and a parameter β [nm] in relation to Rn is: β=Rlc−1.9×Rtac, where Rp [nm] is a retardation in an in-plane direction of the first phase difference film, provided between a first polarizing plate and the liquid crystal cell, having a positive uniaxial anisotropy, Rn [nm] is a retardation in a thickness direction of the second phase difference film, provided between the first polarizing plate and the first phase difference film, having a negative uniaxial anisotropy, Rtac [nm] is a retardation in a thickness direction of the base films of the polarizing plate, and Rlc [nm] is a retardation in a thickness direction of the liquid crystal, the retardation Rp is set to fall within the range from not less than 80% to not more than 120% of the parameter α, and the retardation Rn is set to fall within the range from not less than 60% to not more than 90% of the parameter β.

According to this arrangement, the retardations of the first and second phase difference films are set to fall within the foregoing ranges, respectively. Unlike the case where the retardation in the thickness direction of the base films is treated equally to the retardations in the thickness direction of the first and second phase difference films, this brings about the effect that it is possible to surely obtain a liquid crystal display device which can suppress the coloring and tone degradation within allowable limits in practical use, while maintaining a contrast at a sufficiently high value in practical use when viewed from an oblique direction.

As described above, in addition to the above arrangement, a liquid crystal display device according to the present invention has an arrangement in which the retardation Rlc in the thickness direction of the liquid crystal is set to fall within the range from 324 [nm] to 396 [nm], and the retardation Rp in the in-plane direction of the first phase difference film is set to fall within the range from 30.7 [nm] to 41.7 [nm].

Therefore, even in the case where the variations of the base films caused in the manufacturing process vary the retardation in the thickness direction of the base films, the retardation Rp can be set to fall within the range from 80% to 120% of the parameter α by setting the retardations Rlc and Rp to be in the foregoing ranges. As a result of this, even in the case where the retardation in the thickness direction of the base films varies, it is possible to use the same first phase difference film. This brings about the effect of improving the productivity.

As described above, in addition to the above arrangement, a liquid crystal display device according to the present invention has an arrangement in which the retardation Rp is set to fall within the range from not less than 90% to not more than 110% of the parameter α, and the retardation Rn is set to fall within the range from nor less than 65% to not more than 85% of the parameter β. This brings about the effect that it is possible to obtain a liquid crystal display device that can further suppress the occurrence of coloring and tone degradation when viewed from an oblique direction.

As described above, in addition to the above arrangement, a liquid crystal display device according to the present invention has an arrangement in which the retardation Rlc in the thickness direction of the liquid crystal is set to fall within the range from 342 [nm] to 378 [nm], and the retardation Rp in the in-plane direction of the first phase difference film is set to fall within the range from 33.3 [nm] to 38.6 [nm].

Therefore, even in the case where the retardation Rtac changes depending on the variations of the base films caused in the manufacturing process varies the retardation in the thickness direction of the base films, the retardation Rp can be set to fall within the range from 90% to 110% of the parameter α by setting the retardations Rlc and Rp to be in the foregoing ranges. As a result of this, even in the case where the retardation in the thickness direction of the base films varies, it is possible to use the same first phase difference film. This brings about the effect of improving the productivity.

As described above, a liquid crystal display device of the present invention has an arrangement in which when a parameter α [nm] in relation to Rxy is: α=85−0.09×Rlc− Rtac/20; and a parameter β [nm] in relation to Rz is: β=1.05×Rlc−1.9×Rtac, where Rxy [nm] is a retardation of a phase difference film, provided between the first polarizing plate and the liquid crystal cell, having a biaxial anisotropy, Rz [nm] is a retardation in the thickness direction of the phase difference film, Rtac [nm] is a retardation in the thickness direction of the base films, and Rlc [nm] is the retardation in the thickness direction of the liquid crystal, the retardation Rxy is set to fall within the range from not less than 80% to not more than 120% of the parameter α, and the retardation Rz is set to fall within the range from not less than 60% to not more than 90% of the parameter β.

As described above, a liquid crystal display device of the present invention has an arrangement in which when a parameter α [nm] in relation to Rxy is: α=42.5−0.045×Rlc− Rtac/40; and a parameter β [nm] in relation to Rz is: β=0.525×Rlc−0.95×Rtac, where Rxy [nm] is a retardation in an in-plane direction of each of the first and second phase difference films, provided on two sides of the liquid crystal cell, respectively, having a biaxial anisotropy, Rz [nm] is a retardation in the thickness direction of each of the first and second phase difference films, the retardation Rxy of the first and second phase difference films is set to fall within the range from not less than 80% to not more than 120% of the parameter α, and the retardation Rz of the first and second phase difference films is set to fall within the range from not less than 60% to not more than 90% of the parameter β.

In the above-arranged liquid crystal display devices, the retardations Rxy and Ry are set to fall within the foregoing ranges, respectively. Unlike the case where the retardation in the thickness direction of the base films is treated equally to the retardation of the phase difference film or the retardations in the thickness direction of the first and second phase difference films, this brings about the effect that it is possible to surely obtain a liquid crystal display device which can suppress the coloring and tone degradation within allowable limits in practical use, while maintaining a contrast at a sufficiently high value in practical use when viewed from an oblique direction.

As described above, in addition to the above arrangement, a liquid crystal display device according to the present invention has an arrangement in which the retardation Rxy is set to fall within the range from not less than 90% to not more than 110% of the parameter α, and the retardation Rz is set to fall within the range from not less than 65% to not more than 85% of the parameter β. This brings about the effect that it is possible to obtain a liquid crystal display device that can further suppress the occurrence of coloring and tone degradation when viewed from an oblique direction.

As described above, in addition to the above arrangement, a liquid crystal display device according to the present invention has an arrangement in which regardless of whether or not the above phase difference films have a biaxial anisotropy, the liquid crystal has a negative dielectric anisotropy.

According to this arrangement, liquid crystal molecules oriented in the normal direction to the substrate can be tilted depending on electric intensity by applying an electric field substantially in the vertical direction to the substrate. This can simplify the structure of electrodes, as compared with the case of using a liquid crystal having a positive dielectric anisotropy.

A liquid crystal display device according to the present invention, includes:

a liquid crystal cell having a pair of substrates and liquid crystal interposed therebetween, wherein liquid crystal molecules of said liquid crystal are oriented substantially vertically to respective surfaces of said pair of substrates;

a pair of polarizing plates disposed so as to sandwich said liquid crystal cell therebetween, respective absorption axes of said pair of polarizing plates being orthogonal to each other;

a first phase difference film, disposed between one of said pair of polarizing plates and said liquid crystal cell, said first phase difference film having a positive uniaxial anisotropy; and a second phase difference film, disposed between said one of said pair of polarizing plates and said first phase difference film, said second phase difference film having a negative uniaxial anisotropy, wherein each of said pair of polarizing plates has a base film with an optical axis substantially vertical to said pair of substrates, said base film having a negative uniaxial anisotropy, said first phase difference film has a retardation axis crossing at right angle the absorption axis of said one of said pair of polarizing plates on the same side when seen from said liquid crystal, and said second phase difference film has an optical axis substantially vertical to said pair of substrates, taking the following means.

More specifically, when a parameter α [nm] in relation to Rp is:

$$\alpha = 35 + (Rlc/80 - 4)^2 \times 3.5 + (360 - Rlc) \times Rtac/850;$$ and a parameter β [nm] in relation to Rn is:

$$\beta = Rlc - 1.9 \times Rtac,$$

where Rp [nm] is a retardation in an in-plane direction of the first phase difference film, Rn [nm] is a retardation in a thickness direction of the second phase difference film, Rtac [nm] is a retardation in a thickness direction of the base films, and Rlc [nm] is a retardation in a thickness direction of the liquid crystal, the retardation Rp is set to fall within a range from not less than 80% to not more than 120% of the parameter α, and the retardation Rn is set to fall within a range from not less than 60% to not more than 90% of the parameter β.

In the above-arranged liquid crystal display device, liquid crystal molecules oriented substantially vertically to the substrates, although not bringing a phase difference to light incident from the normal direction to the substrate, bring a phase difference depending on a polar angle (tilt angle to the normal direction) to obliquely incident light. Therefore, the liquid crystal display device cannot completely absorb the light supposed to be absorbed by the polarizing plate on the side from where the light emits, without the first and second phase difference films. This results in the occurrence of light leakage, thus degrading a contrast and causing the coloring and tone degradation.

In order to solve the problem, since the above arrangement is provided with first and second phase difference films, the phase difference that the liquid crystal has brought depending on the polar angle can be compensated by the first and second phase difference films. As a result of this, it is possible to prevent light leakage when viewed from an oblique direction, enhancing the contrast and preventing the occurrence of coloring and tone degradation.

Incidentally, when the respective retardations of the first and second phase difference films are determined, it cannot be always said that just subtracting the retardation in the thickness direction of the base films from each of the respective retardations in the thickness direction of the first and second phase difference films, which is an optimum retardation when base films are absent, is sufficient, because the coloring and tone degradation caused when viewed from an oblique direction are required to be suppressed much further.

The inventors of the present application, as a result of extensive research to further suppress the coloring and tone degradation, while maintaining a contrast at a sufficiently high value in practical use when a vertical alignment mode liquid crystal display device is viewed from an oblique direction, have found that the retardation in the thickness direction of the base films does not always function as equally as each of the retardation in the thickness direction of the first phase difference film and the retardation in the thickness direction of the second phase difference film. Specifically, the inventors have found to complete the present invention that: when the retardation in the in-plane direction of the first phase difference film with a positive uniaxial anisotropy is set so that the contrast becomes the maximum, the dependency of the retardation Rp on the retardation in the thickness direction of the base films, reverses depending on whether the retardation of the liquid crystal is over 360 [nm], and it is possible to effectively suppress the coloring and tone degradation by setting the retardations to fall in a predetermined range with reference to such retardations that the contrast becomes the maximum.

In the liquid crystal display device of the present invention, the retardations Rp and Rn are set according to the retardation Rtac in the thickness direction of the base films and the retardation Rlc in the thickness direction of the liquid crystal, and the retardations Rp and Rn are set to fall in the range where the coloring and tone degradation can be tolerated, while maintaining a contrast at a sufficiently high value in practical use when viewed from an oblique direction. With this arrangement, unlike the arrangement in which the retardation in the thickness direction of the base films is treated equally to the retardation in the thickness direction of the first phase difference film and the retardation in the thickness direction of the second phase difference film, it is possible to surely obtain a liquid crystal display device which can maintain a contrast at a sufficiently high value in practical use when viewed from the oblique direction and suppress the coloring and tone degradation within allowable limits.

In the case where the improvement in productivity is especially required, in addition to the above arrangement, it is desirable that the retardation Rlc in the thickness direction of the liquid crystal is set to fall within the range from 324 [nm] to 396 [nm], and the retardation Rp in the in-plane direction of the first phase difference film is set to fall within the range from 30.7 [nm] to 41.7 [nm].

If the retardation Rlc is set to fall in the foregoing range, the dependency of the retardation Rp on the retardation in the thickness direction of the base films is small. Therefore, even in the case where the variations of the base films caused in the manufacturing process varies the retardation in the thickness direction of the base films, the retardation Rp can be set to fall within the range from 80% to 120% of the parameter α by setting the retardations Rlc and Rp to fall within the foregoing ranges. As a result of this, even in the case where the retardation in the thickness direction of the base films varies, it is possible to use the same first phase difference film, thus improving the productivity.

Further, in the case where the suppression of coloring and tone degradation is especially required, in addition to the above arrangement, it is desirable that the retardation Rp is set to fall within the range from not less than 90% to not more than 110% of the parameter α, and the retardation Rn is set to fall within the range from not less than 65% to not more than 85% of the parameter β. With this arrangement, it is possible to obtain a liquid crystal display device which can further suppress the coloring and tone degradation when viewed from an oblique direction.

Still further, in the case where both the suppression of coloring and tone degradation and the improvement in productivity are especially required, it is desirable that the retardation Rlc in the thickness direction of the liquid crystal is set to fall within the range from 342 [nm] to 378 [nm], and the retardation Rp in the in-plane direction of the first phase difference film is set to fall within the range from 33.3 [nm] to 38.6 [nm].

If the retardations Rlc and Rp are set to fall in the foregoing ranges, the retardation Rp can be set to fall in the range from 90% to 110% of the parameter α even in the case where the variations of the base films caused in the manufacturing process varies the retardation in the thickness direction of the base films. As a result of this, even in the case where the retardation in the thickness direction of the base films varies, it is possible to use the same first phase difference film, thus improving the productivity.

Meanwhile, a liquid crystal display device according to the present invention, includes:

a liquid crystal cell having a pair of substrates and liquid crystal interposed therebetween, wherein liquid crystal molecules of said liquid crystal are oriented substantially vertically to respective surfaces of said pair of substrates;

a pair of polarizing plates disposed so as to sandwich said liquid crystal cell therebetween, respective absorption axes of said pair of polarizing plates being orthogonal to each other; and a phase difference film, disposed between one of said pair of polarizing plates and said liquid crystal cell, said phase difference film having a biaxial anisotropy, wherein each of said pair of polarizing plates has a base film with an optical axis substantially vertical to said pair of substrates, said base film having a negative uniaxial anisotropy, and said phase difference film has an in-plane retardation axis crossing at right angle the absorption axis of said one of said pair of polarizing plates on the same side when seen from said liquid crystal, taking the following means.

More specifically, when a parameter α [nm] rel to Rxy is:

$$\alpha = 85 - 0.09 \times Rlc - Rtac/20;\ \text{and}$$

a parameter β [nm] in relation to Rz is:

$$\beta = 1.05 \times Rlc - 1.9 \times Rtac,$$

where Rxy [nm] is a retardation in an in-plane direction of the phase difference film, Rz [nm] is a retardation in a thickness direction of the phase difference film, Rtac [nm] is a retardation in a thickness direction of the base films, and Rlc [nm] is a retardation in a thickness direction of the liquid crystal, the retardation Rxy is set to fall within a range from not less than 80% to not more than 120% of the parameter α, and the retardation Rz is set to fall within a range from not less than 60% to not more than 90% of the parameter β.

Further, a liquid crystal display device according to the present invention, includes:

a liquid crystal cell having a pair of substrates and liquid crystal interposed therebetween, wherein liquid crystal molecules of said liquid crystal are oriented substantially vertically to respective surfaces of said pair of substrates;

a pair of polarizing plates disposed so as to sandwich said liquid crystal cell therebetween, respective absorption axes of said pair of polarizing plates being orthogonal to each other;

a first phase difference film, disposed between one of said pair of polarizing plates and said liquid crystal cell, said first phase difference film having a biaxial anisotropy; and a second phase difference film, disposed between the other of said pair of polarizing plates and said liquid crystal cell, said second phase difference film having a biaxial anisotropy, wherein each of said pair of polarizing plates has a base film with an optical axis substantially vertical to said pair of substrates, said base film having a negative uniaxial anisotropy, and each of said first and second phase difference films has an in-plane retardation axis crossing at right angle the absorption axis of said one of said pair of polarizing plates on the same side when seen from said liquid crystal, taking the following means.

More specifically, when a parameter α [nm] in relation to Rxy is:

$$\alpha = 42.5 - 0.045 \times Rlc - Rtac/40;\ \text{and}$$

a parameter β [nm] in relation to Rz is:

$$\beta = 0.525 \times Rlc - 0.95 \times Rtac,$$

where Rxy [nm] is a retardation in an in-plane direction of each of the first and second phase difference films, Rz [nm] is a retardation in a thickness direction of each of the first and second phase difference films, Rtac [nm] is a retardation in a thickness direction of the base films, and Rlc [nm] is a retardation in a thickness direction of the liquid crystal, the retardation Rxy of the first and second phase difference films is set to fall within a range from not less than 80% to not more than 120% of the parameter α, and the retardation Rz of the first and second phase difference films is set to fall within a range from not less than 60% to not more than 90% of the parameter β.

In the above-arranged liquid crystal display devices, the phase difference that the liquid crystal has brought to the light in an oblique direction, in the state where liquid crystal molecules are oriented substantially vertically to the substrates, is compensated by the phase difference film or the first and second phase difference films. This prevents the light leakage when viewed from an oblique direction, thus enhancing the contrast.

However, even in the foregoing arrangement, when the retardation of the phase difference film or the respective retardations of the first and second phase difference films are determined, it cannot be always said that just subtracting the retardation in the thickness direction of the base films from each of the respective retardations in the thickness direction of the phase difference films, which is an optimum retardation when base films are absent, is sufficient, because further suppression of the coloring and tone degradation when viewed from an oblique direction is required.

The inventors of the present application, as a result of extensive research to further enhance the contrast when a vertical alignment mode liquid crystal display device is viewed from an oblique direction, have found that the retardation in the thickness direction of the base films does not always function as equally as the retardation in the thickness direction of the phase difference film or each of the respective retardations in the thickness direction of the first and second phase difference films, as in the case of the foregoing liquid crystal display device. Specifically, the inventors have found to complete the present invention that the retardation Rxy in the in-plane direction of the phase difference film with a biaxial anisotropy and the retardation Rtac in the thickness direction of the base films are different in the direction of the retardation from each other; however, the influence of the retardation Rtac should be also added in order to properly set the retardation Rxy, and that it is possible to effectively suppress the coloring and tone degradation by setting the retardations to fall in a predetermined range with reference to such retardations that the contrast becomes the maximum.

In the liquid crystal display device of the present invention, the retardation Rxy in the in-plane direction of the phase difference film or each of the first and second phase difference films and the retardation Rz in the thickness direction of the phase difference film or each of the first and second phase difference films are set according to the retardation Rlc in the thickness direction of the liquid crystal and the retardation Rtac in the thickness direction of the base films; and the retardations Rxy and Rz are set to fall in the range where the coloring and tone degradation can be tolerated, while maintaining a contrast at a sufficiently high value in practical use when viewed from an oblique direction. With this arrangement, unlike the case where the retardation in the thickness direction of the base films is treated equally to the retardation in the thickness direction of the phase difference film and each of the respective retardations in the thickness direction of the first and second phase difference films, it is possible to surely obtain a liquid crystal display device which can maintain a contrast at a sufficiently high value in practical use when viewed from the oblique direction and suppress the coloring and tone degradation within allowable limits.

Also, in the case where the suppression of coloring and tone degradation is especially required, in addition to the above arrangement, it is desirable that the retardation Rxy is set to fall within the range from not less than 90% to not more than 110% of the parameter α, and the retardation Rz is set to fall within the range from not less than 65% to not more than 85% of the parameter β. With this arrangement, it is possible to obtain a liquid crystal display device which can further suppress the coloring and tone degradation when viewed from an oblique direction.

Further, in the liquid crystal display device according to the present invention, it is desirable that the liquid crystal has a negative dielectric anisotropy, regardless of whether or not the phase difference films have biaxial anisotropy.

According to this arrangement, liquid crystal molecules oriented in the normal direction to the substrate can be tilted depending on electric intensity by applying an electric field substantially in the vertical direction to the substrate. This can simplify the structure of electrodes, as compared with the case of using a liquid crystal having a positive dielectric anisotropy.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, according to the liquid crystal display device of the present invention, the retardations Rp and Rn are set according to the retardation Rtac in the thickness direction of the base films and the retardation Rlc in the thickness direction of the liquid crystal as well as set in the range where the coloring and tone degradation can be tolerated, while maintaining a contrast at a sufficiently high value in practical use when viewed from an oblique direction. With this arrangement, unlike the case where the retardation in the thickness direction of the base films is treated equally to each of the respective retardations in the thickness direction of the first and second phase difference films, it is possible to surely obtain a liquid crystal display device which can suppress the coloring and tone degradation within allowable limits in practical use, while maintaining a contrast at a sufficiently high value in practical use when viewed from an oblique direction.

The invention claimed is:

1. A liquid crystal display device, comprising:
a liquid crystal cell having a pair of substrates and liquid crystal interposed therebetween, wherein liquid crystal molecules of said liquid crystal are oriented substantially vertically to respective surfaces of said pair of substrates;
a pair of polarizing plates disposed so as to sandwich said liquid crystal cell therebetween, respective absorption axes of said pair of polarizing plates being orthogonal to each other;
a first phase difference film, disposed between one of said pair of polarizing plates and said liquid crystal cell, said first phase difference film having a positive uniaxial anisotropy; and
a second phase difference film, disposed between said one of said pair of polarizing plates and said first phase difference film, said second phase difference film having a negative uniaxial anisotropy,
wherein each of said pair of polarizing plates has a base film with an optical axis substantially vertical to said pair of substrates, said base film having a negative uniaxial anisotropy, said first phase difference film has a retardation axis crossing at right angle the absorption axis of said one of said pair of polarizing plates on the same side when seen from said liquid crystal, and said second phase difference film has an optical axis substantially vertical to said pair of substrates; and
when a parameter α [nm] in relation to Rp is:

$\alpha = 35 + (Rlc/80 - 4)^2 \times 3.5 + (360 - Rlc) \times Rtac/850$, and a parameter β [nm] in relation to Rn is:

$\beta = Rlc - 1.9 \times Rtac$, where Rp [nm] is a retardation in an in-plane direction of said first phase difference film, Rn [nm] is a retardation in a thickness direction of said second phase difference film, Rtac [nm] is a retardation in a thickness direction of said base film, and Rlc [nm] is a retardation in a thickness direction of said liquid crystal, said retardation Rp is set to fall within a range from not less than 80% to not more than 120% of the parameter α, and said retardation Rn is set to fall within a range from not less than 85% to not more than 90% of the parameter β.

2. The liquid crystal display device according to claim 1, wherein said liquid crystal has a negative dielectric anisotropy.

3. A liquid crystal display device, comprising:

a liquid crystal cell having a pair of substrates and liquid crystal interposed therebetween, wherein liquid crystal molecules of said liquid crystal are oriented substantially vertically to respective surfaces of said pair of substrates;

a pair of polarizing plates disposed so as to sandwich said liquid crystal cell therebetween, respective absorption axes of said pair of polarizing plates being orthogonal to each other; and a phase difference film, disposed between one of said pair of polarizing plates and said liquid crystal cell, said phase difference film having a biaxial anisotropy, wherein each of said pair of polarizing plates has a base film with an optical axis substantially vertical to said pair of substrates, said base film having a negative uniaxial anisotropy, and said phase difference film has an in-plane retardation axis crossing at right angle the absorption axis of said one of said pair of polarizing plates on the same side when seen from said liquid crystal, when a parameter α [nm] in relation to Rxy is:

$\alpha = 85 - 0.09 \times Rlc - Rtac/20$, and a parameter β [nm] in relation to Rz is:

$\beta = 1.05 \times Rlc - 1.9 \times Rtac$, where Rxy [nm] is a retardation in an in-plane direction of the phase difference film, Rz [nm] is a retardation in a thickness direction of the phase difference film, Rtac [nm] is a retardation in a thickness direction of the base films, and Rlc [nm] is a retardation in a thickness direction of the liquid crystal, said retardation Rxy is set to fall within a range from not less than 80% to not more than 120% of the parameter α, and said retardation Rz is set to fall within a range from not less than 60% to not more than 85% of the parameter β.

4. The liquid crystal display device according to claim 3, wherein said liquid crystal has a negative dielectric anisotropy.

5. A liquid crystal display device, comprising:

a liquid crystal cell having a pair of substrates and liquid crystal interposed therebetween, wherein liquid crystal molecules of said liquid crystal are oriented substantially vertically to respective surfaces of said pair of substrates;

a pair of polarizing plates disposed so as to sandwich said liquid crystal cell therebetween, respective absorption axes of said pair of polarizing plates being orthogonal to each other;

a first phase difference film, disposed between one of said pair of polarizing plates and said liquid crystal cell, said first phase difference film having a biaxial anisotropy; and a second phase difference film, disposed between the other of said pair of polarizing plates and said liquid crystal cell, said second phase difference film having a biaxial anisotropy, wherein each of said pair of polarizing plates has a base film with an optical axis substantially vertical to said pair of substrates, said base film having a negative uniaxial anisotropy, and each of said first and second phase difference films has an in-plane retardation axis crossing at right angle the absorption axis of said one of said pair of polarizing plates on the same side when seen from said liquid crystal; and when a parameter α [nm] in relation to Rxy is:

$\alpha = 42.5 - 0.045 \times Rlc - Rtac/40$, and a parameter β [nm] in relation to Rz is:

$\beta = 0.525 \times Rlc - 0.95 \times Rtac$, where Rxy [nm] is a retardation in an in-plane direction of each of said first and second phase difference films, Rz [nm] is a retardation in a thickness direction of each of said first and second phase difference films, Rtac [nm] is a retardation in a thickness direction of the base films, and Rlc [nm] is a retardation in a thickness direction of the liquid crystal, said retardation Rxy of said first and second phase difference films is set to fall within a range from not less than 80% to not more than 120% of the parameter α, and said retardation Rz of said first and second phase difference films is set to fall within a range from not less than 85% to not more than 90% of the parameter β.

6. The liquid crystal display device according to claim 5, wherein said liquid crystal has a negative dielectric anisotropy.

* * * * *